(12) United States Patent
Copeland

(10) Patent No.: US 7,697,591 B2
(45) Date of Patent: Apr. 13, 2010

(54) CREST FACTOR REDUCTION PROCESSOR FOR WIRELESS COMMUNICATIONS

(75) Inventor: Gregory C. Copeland, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1829 days.

(21) Appl. No.: 10/643,179

(22) Filed: Aug. 18, 2003

(65) Prior Publication Data

US 2004/0052314 A1 Mar. 18, 2004

Related U.S. Application Data

(60) Provisional application No. 60/406,002, filed on Aug. 26, 2002, provisional application No. 60/406,310, filed on Aug. 27, 2002.

(51) Int. Cl.
*H04B 1/00* (2006.01)
(52) U.S. Cl. .................................................. 375/130
(58) Field of Classification Search ................. 375/146, 375/296, 130, 135, 138, 140, 132, 219
See application file for complete search history.

(56) References Cited

U.S. PATENT DOCUMENTS

| | | | |
|---|---|---|---|
| 5,621,762 A | 4/1997 | Miller et al. | |
| 6,009,090 A | 12/1999 | Oishi et al. | |
| 6,147,984 A | 11/2000 | McCoy | |
| 6,175,551 B1 | 1/2001 | Awater et al. | |
| 6,426,983 B1 * | 7/2002 | Rakib et al. | 375/346 |
| 6,449,302 B2 | 9/2002 | Hunton | |
| 6,449,303 B2 | 9/2002 | Hunton | |
| 6,496,546 B1 * | 12/2002 | Allpress et al. | 375/316 |
| 6,674,328 B2 * | 1/2004 | Uto et al. | 330/259 |
| 6,931,239 B2 * | 8/2005 | Hongo et al. | 375/296 |
| 7,003,017 B2 * | 2/2006 | Hunton | 375/146 |

(Continued)

OTHER PUBLICATIONS

Vesma et al., "The Effects of Quantizing the Fractional Interval in Interpolation Filters", NORSIG (IEEE, 2000).

(Continued)

*Primary Examiner*—Jean B Corrielus
(74) *Attorney, Agent, or Firm*—Ronald O. Neerings; Wade James Brady, III; Frederick J. Telecky, Jr.

(57) ABSTRACT

A wireless base station (15) for transmitting spread spectrum signals is disclosed. The base station (15) includes a peak compression unit (16), which is comprised of a sequence of peak detection and cancellation circuits (32). Each peak detection and cancellation circuit (32) detects and compresses identified peaks. The further stages of peak detection and cancellation circuits (32) serve to reduce peaks that, as a result of "peak regrowth", are caused at sample points near to a reduced peak point. According to one disclosed embodiment, a peak sample point is not qualified for compression unless a number of sample points subsequent to the peak all have lower magnitude than that of the peak. The cancellation pulses applied by the peak detection and cancellation circuits (32) may be generated by a finite impulse response (FIR) filter pulse, or alternatively by a minimum phase infinite impulse response (IIR) pulse. The peak compression unit (16) identifies and compresses statistical peaks in the digital symbol amplitude, so that the dynamic range requirements of the power amplifier (24) in the base station (15) may be relaxed.

30 Claims, 11 Drawing Sheets

U.S. PATENT DOCUMENTS

| | | | | |
|---|---|---|---|---|
| 2001/0055294 | A1* | 12/2001 | Motoyoshi | 375/132 |
| 2002/0006169 | A1* | 1/2002 | Hunton | 375/295 |
| 2002/0196839 | A1* | 12/2002 | Hunton | 375/130 |
| 2004/0052095 | A1* | 3/2004 | Muegge et al. | 363/21.12 |

OTHER PUBLICATIONS

Gardner, "Interpolation in Digital Modems—Part I: Fundamentals", Trans. Comm., vol. 41, No. 3 (IEEE, Mar. 1993), pp. 501-507.

Gardner, "Interpolation in Digital Modems—Part II: Implementation and Performance", *Trans. Comm.*, vol. 41, No. 6 (IEEE, Jun. 1993),pp. 998-1008.

Laakso et al., "Splitting the Unit Delay", Signal Processing Magazine (IEEE, Jan. 1996), pp. 30-60.

Dinan et al., "Spreading Codes for Direct Sequence CDMA and Wideband CDMA Cellular Networks", *Communications* (IEEE, Sep. 1998), pp. 48-54.

Adachi et al., "Wideband DS-CDMA for Next-Generation Mobile Communications Systems", *Communications* (IEEE, Sep. 1998), pp. 56-69.

Ojanpera et al., "An Overview of Air Interface Multiple Access for IMT-2000/UMTS", *Communications* (IEEE, Sep. 1998), pp. 82-95.

Wright et al., "Multicarrier-WCDMA Basestation Design Considerations—Amplifier Linearization and Crest Factor Control" (PMC-Sierra, Aug. 2002).

* cited by examiner

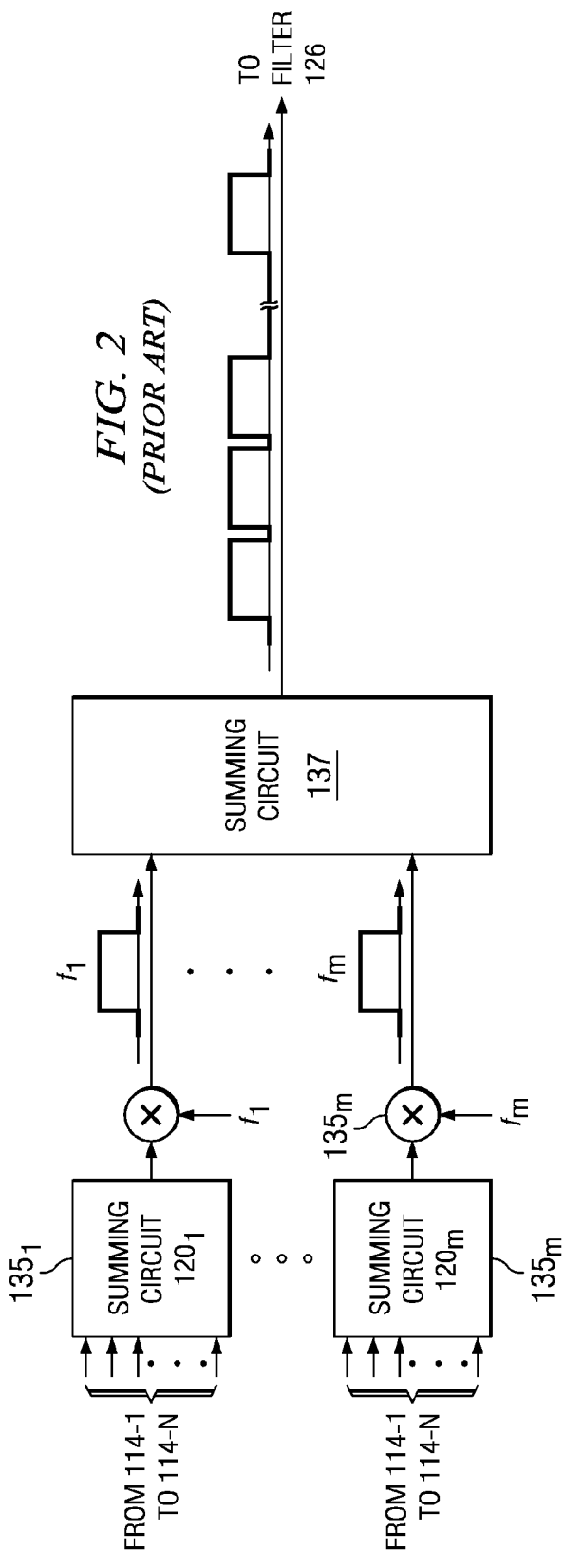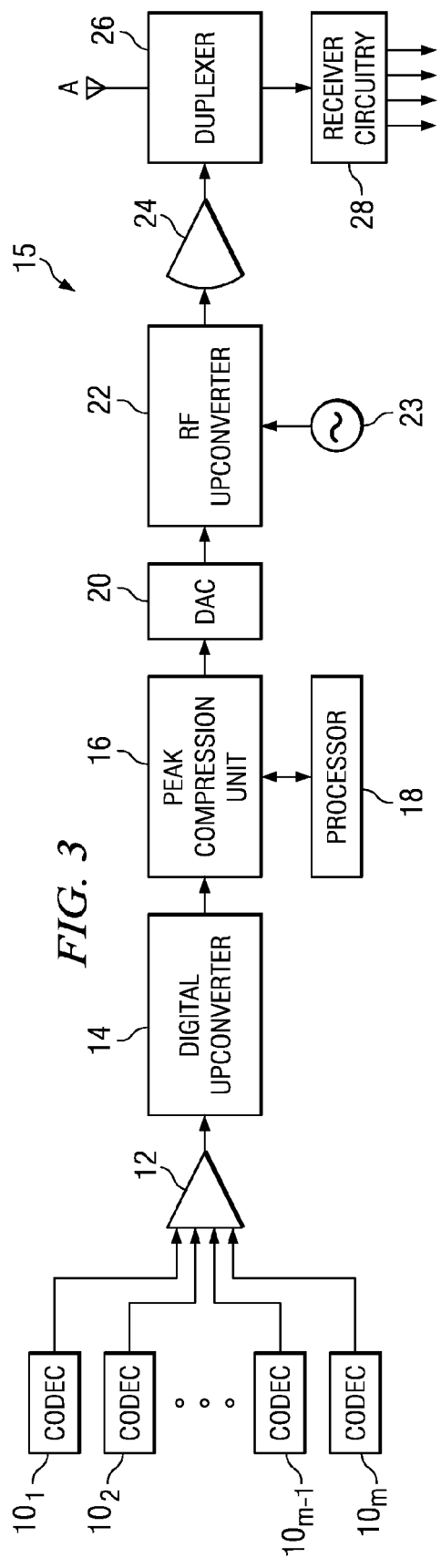

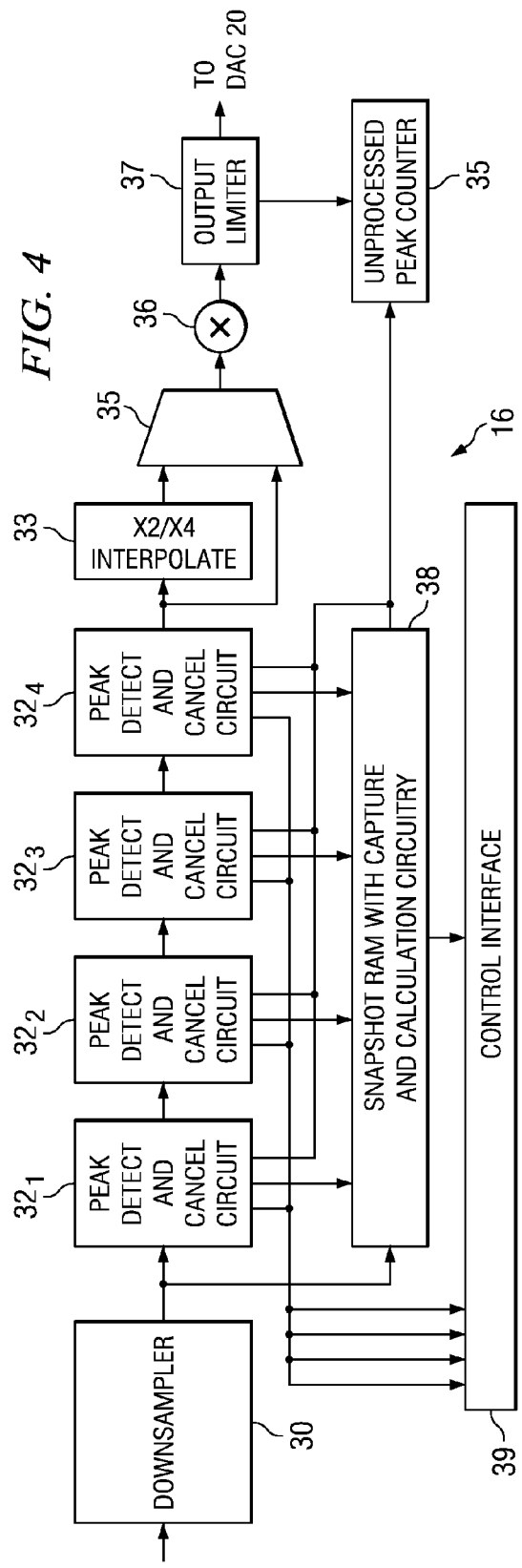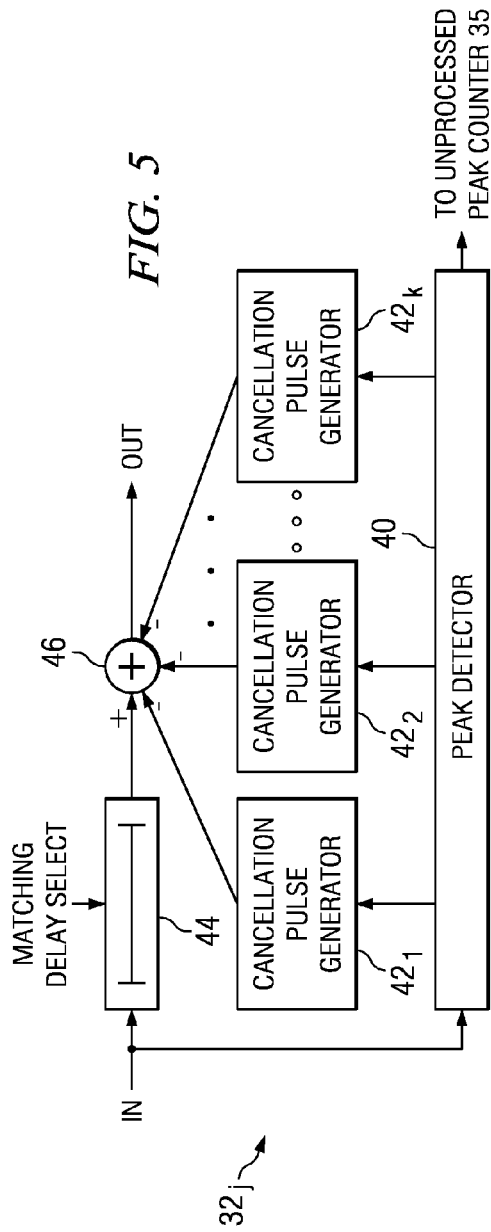

CREST FACTOR REDUCTION PROCESSOR FOR WIRELESS COMMUNICATIONS

CROSS-REFERENCE TO RELATED APPLICATIONS

This application claims priority, under 35 U.S.C. §119(e), of Provisional Application No. 60/406,002, filed Aug. 26, 2002, and of Provisional Application No. 60/406,310, filed Aug. 27, 2002.

STATEMENT REGARDING FEDERALLY SPONSORED RESEARCH OR DEVELOPMENT

Not applicable.

BACKGROUND OF THE INVENTION

This invention is in the field of data communications, and is more specifically directed to the shaping of broadband signals prior to transmission.

The prevalence of wireless telephones in modern society, as well as in developing countries, has exploded over recent years. Much of the increased deployment of this technology is due to recently implemented communications technologies that have enabled higher quality telephone reception, at lower costs. In addition, these technologies are now enabling a wider functionality for wireless telephones than simply voice communications. Text messaging has become quite popular, as has the use of wireless telephones to receive and send email messages. Combined phone/camera handsets are also now available, by way of which the user can transmit a digital photograph as part of a wireless telephone communication. In some markets, music can be downloaded to a wireless telephone for enjoyment during commuting. It is contemplated that Internet browsing will become a popular wireless telephone service before long, given the ongoing advances in this field.

An important one of these technologies is Code Division Multiple Access (CDMA), which is becoming the predominant technology for modem wireless telephony. This well-known approach is a type of spread spectrum communications, in which the baseband digital signal that is to be transmitted is "spread" over a wider bandwidth by the application of a spreading code to the signal. In effect, application of the spreading code converts the baseband signal into a higher frequency signal, with frequency components spread over a wider frequency band, but that communicates the same data content. According to CDMA, a base station can communicate with many handsets ("users") within its range by using a different spreading code for each user, each selected from a set of orthogonal spreading codes. The user despreads the received transmission by applying the same spreading code as used in transmission. Because the spreading codes are orthogonal, the transmissions to the various users do not interfere with one another; indeed, baseband signals that are spread with one of the orthogonal spreading codes appear to be Gaussian noise when another one of the orthogonal codes attempts to decode it.

The so-called third generation ("3G") wireless telephone services are contemplated to use a 3G version of CDMA communications that is referred to as wideband CDMA ("WCDMA", also known as "UMTS", and a variation of which is referred to as "CDMA2000"). In WCDMA, the baseband signal (or multiple signals spread by orthogonal codes) is spread over a 5 MHz communications channel (or 1.25 MHz in CDMA2000), achieving high data rate communications suitable for data, video, and other 3G services while maintaining excellent noise immunity. In conventional communications systems, multiple 5 MHz channels are simultaneously transmitted from each base station, further increasing the number of users that can be served.

FIG. 1 illustrates a conventional architecture for a wireless telephone base station, supporting many users within its service range. This conventional spread spectrum communication base station 200 receives signals (typically audio signals, but which may also include text or graphics information in the 3G context) to be transmitted from multiple channels. Typically, each channel's signal stream is generated by a vocoder or the like (not shown). Base station 200 includes N symbol converters 100-1 to 100-N that converts the received signals, which are in the form of digital bitstreams, to encoded symbols according to the desired modulation scheme, such as QPSK (Quadrature Phase Shift Keying). The output of symbol converters 100 typically includes both in-phase and quadrature phase components, corresponding to complex symbols. Each channel includes a corresponding mixer 110, which applies a spreading code defined by corresponding spreading code circuit 112, for example a Walsh code, to the symbol stream from symbol converter 100 for that channel. The spreading codes are orthogonal to one another so that the multiple channels can be combined into a single transmitted signal, while permitting the data for each channel to be recovered by the application of a matching despreading code, as known in the art. In this conventional base station 200, the spread channel signal is applied to mixer 114, which applies a cell-specific scrambling code, generated by scrambling code circuit 116, to the spread spectrum signal. The multiple spread and scrambled complex channel data are then combined by circuit 120 into a single output symbol stream for transmission. The typical steps in generating the transmitted signal include upsampling in the digital domain by conventional upsampling circuit 124 to convert the symbol rate to the desired frequency range, conventional filtering applied by filter 126, conversion to an analog signal by digital-to-analog converter (DAC) 128, mixing with the desired RF carrier 136 at RF mixer 134, and amplification by RF amplifier 130 and transmission from antenna 132 of base station 200, as shown in FIG. 1. Those receivers within the service range of base station 200 will thus receive the transmitted signal, and effect the conventional descrambling, decoding, and demodulation to recover the communication for their corresponding one of the N transmitted channels.

In this conventional base station 200, the combined signal produced by circuit 120 is a time domain signal that is effectively a sum, at each sample point, of the spread and scrambled in-phase and quadrature-phase symbols for the N channels. Especially considering that the spreading codes for the N channels are orthogonal to one another, the amplitudes of the N channels at each sample point in time are uncorrelated and independent of one another. As a result, it is statistically likely, especially over a large number of sample times, that the amplitudes of the N channels can align with one another to create an extremely high amplitude peak at a given sample time. This peak amplitude can be very high as compared with the average amplitude over the transmission time.

However, the dynamic range of RF amplifier 130 is necessarily limited, especially in conventional systems in which cost is a competitive factor. In order for RF amplifier 130 to faithfully transmit all sample points without undue distortion, it must be able to amplify these peak amplitudes without clipping. For a given dynamic range, therefore, the average output power may be forced to a relatively low level to permit distortion-free amplification of the peaks. A low average power affects the signal-to-noise ratio of the transmission, however, reducing communication quality. Accordingly, an important concern in spread spectrum communications systems is the peak-to-average ratio (PAR).

By way of further background, the PAR is exacerbated in those systems, such as wireless base stations, that transmit multiple channels over each of multiple frequency bands. These systems are commonly referred to in the art as multi-carrier communications systems. FIG. 2 illustrates such a multi-carrier system, in which multiple summing circuits $120_1$ through $120_m$ are each combined into a single symbol stream for transmission. In this example, N channels of spread scrambled symbols are summed by each of m summing circuits 120. The summed signals occupy a certain bandwidth at baseband, for example within on the order of 5 MHz as known in the art. In this conventional approach, the m 5 MHz symbol basebands are each mixed with a carrier frequency $f_1$ through $f_m$, and then combined at summing circuit 137. The spectrum of the resulting combined signal from summing circuit 137 thus occupies m non-overlapping frequency bands, one corresponding to each of the m summing circuits 120. This resulting combined signal is thus also subject to providing large peak amplitudes at any given sample time, with the possibility of even a higher PAR considering that a larger number of independent channels (i.e., N times m combined channels) are involved.

It is known in the art to provide circuitry or functionality to reduce the peak amplitudes of combined spread spectrum signals. Referring back to FIG. 1, conventional base station 200 includes such peak reduction functionality, in the form of peak reduction unit 122, which reduces or eliminates signal peaks that will exceed a specified maximum signal peak power level.

U.S. Pat. No. 6,009,090 describes a simple conventional approach to peak or crest reduction. According to this approach, peak reduction unit 122 compares the amplitude at each sample point in the combined symbol stream to a threshold value. If the amplitude exceeds the threshold, peak reduction unit 122 simply truncates the symbol amplitude to a desired level. It has been observed, however, that this conventional approach, while simple, may not eliminate all peaks in the transmitted signal, due to the effects of downstream filter 126. In addition, this approach can also introduce distortion into the transmitted signal.

By way of further background, another approach to crest factor reduction, or PAR reduction, is described in U.S. Pat. No. 5,621,762. According to this conventional approach, the in-phase and quadrature-phase component amplitudes of the symbols to be transmitted within sequence are analyzed by a peak suppression algorithm, for example as implemented in peak reduction unit 122. The algorithm anticipates the effects of downstream filters and other factors, in analyzing these symbol amplitudes. If the algorithm determines that a transition from one symbol to the next will result in an excessively large peak at the transmitter output, the amplitudes of the in-phase and quadrature-phase components are scaled from their nominal values for that symbol to avoid generation of peaks in the output signal. This reduces the peak power demand on the amplifier, and permits the average output power to be increased for a given amplifier dynamic range.

According to a similar approach, an example of which is described in U.S. Pat. No. 6,449,302, conventional peak reduction unit 122 (also referred to as a crest factor reduction unit) predicts the output of filter 126 based on the incoming symbol stream. Peak reduction unit 122 then performs crest factor reduction processing on the symbol stream to reduce predicted signal peaks that will occur as a result of filter 126, using the known impulse response function of filter 126. Typically, this digital predistortion is accomplished by a non-linear distortion function that is built into the baseband digital processing prior to transmission. The non-linear predistortion function is applied to each of the individual carrier symbol streams, when used in a multi-carrier context, and corresponds to the distortion that will be exhibited by the RF amplifier, but of opposite polarity. As a result, the output signal presented by the RF amplifier is a cascade of the two non-linear distortion functions (i.e., the crest factor reduction plus the amplifier distortion), equating to a linear system. It has been stated that this approach permits the use of a simple class AB amplifier for transmission, reducing cost and improving system efficiency.

While conventional peak reduction techniques are often capable of reducing individual peaks in the spread spectrum signal, it has been observed, in connection with this invention, that the reduction of one peak may result in the creation of one or more other peaks at nearby sample points. Specifically, conventional peak reduction requires the modification of not only the peak sample point, but also the modification of neighboring sample points in order to remain within the signal-to-noise requirements of the system. The adjustment of neighboring sample points according to conventional peak reduction techniques can cause those neighboring sample points to themselves become peaks after peak reduction, even though their amplitudes did not originally qualify as peaks. In addition, it has been observed that many conventional peak reduction techniques are not effective for multi-carrier signals, as are now commonly used in WCDMA and CDMA2000 transmissions.

BRIEF SUMMARY OF THE INVENTION

It is an object of this invention to provide an improved peak or crest factor reduction function for spread spectrum transmitters.

It is a further object of this invention to provide such a function that can accurately reduce peaks in a symbol stream with minimal effect on neighboring symbol amplitudes.

It is a further object of this invention to provide such a function that is especially suitable for multiple carrier spread spectrum communications.

It is a further object of this invention to provide such a function that can be easily implemented into wireless spread spectrum base stations.

It is a further object of this invention to provide such a function that can support multiple channels, and can reduce peaks in either real or complex amplitudes.

It is a further object of this invention to provide such a function that includes a user-definable cancellation threshold and a user-definable cancellation pulse amplitude.

Other objects and advantages of this invention will be apparent to those of ordinary skill in the art having reference to the following specification together with its drawings.

The present invention may be implemented into a peak compression circuit function, for example as implemented within the transmit path of a wireless base station. The peak compression function applies multiple peak compression operations sequentially, following the digital upconversion of a combined symbol stream. The input symbol stream includes combined code division multiplexed (CDMA) channels, either at baseband, or alternatively in a multi-carrier stream. The multiple peak compression operations detect and reduce individual peak amplitudes in the symbol stream. These multiple operations are followed by a hard or soft limiter, to remove residual peaks.

According to another aspect of the invention, each of the multiple peak compression operations are performed by pre-qualifying samples as potential peaks, interpolating around the potential peak point, and identifying the magnitude and location of the peak from the interpolation. If the identified peak exceeds the maximum threshold, its amplitude is scaled by applying a compensating pulse at that sample position.

According to another aspect of the invention, the peak compression function identifies the magnitude and location of a peak, storing the result prior to applying the correction. If a larger peak occurs within a specified time after the first identified peak, the first peak is not corrected but rather the larger peak is instead corrected. This reduces the likelihood of over-correction of peaks by the correction of a slightly later peak in the stream.

BRIEF DESCRIPTION OF THE SEVERAL VIEWS OF THE DRAWING

FIG. 2 is an electrical diagram, in block form, of a portion of a conventional wireless spread spectrum base station for transmitting multiple carrier signals.

FIG. 3 is an electrical diagram, in block form, of a base station constructed according to the preferred embodiment of the invention.

FIG. 4 is an electrical diagram, in block form, of a peak compression unit in the base station of FIG. 3, according to the preferred embodiment of the invention.

FIG. 5 is an electrical diagram, in block form, of a peak detection and cancellation circuit in the peak compression function of FIG. 4, according to the preferred embodiment of the invention.

DETAILED DESCRIPTION OF THE INVENTION

Figure 1:
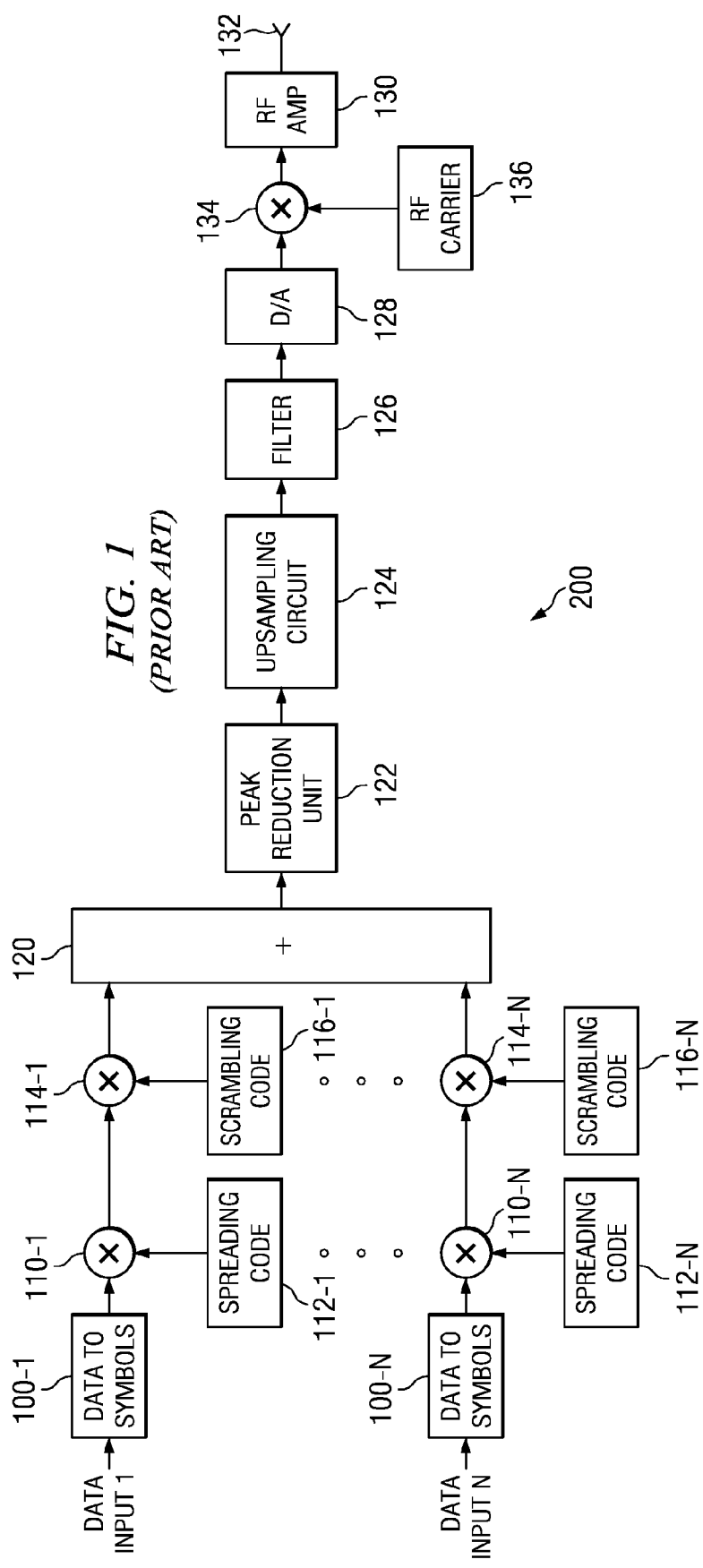
FIG. 1 is an electrical diagram, in block form, of a conventional wireless spread spectrum base station.

The present invention will be described in connection with its preferred embodiment, namely as implemented into a base station that transmits multiple carrier spread spectrum wireless signals. This implementation of the preferred embodiment of the invention is described in this specification because it is believed that this invention is especially beneficial when used in such a context. However, those skilled in the art having reference to this specification will readily recognize that this invention may be applied in other communications contexts, providing important benefits in those contexts. Accordingly, it is to be understood that the following description is provided by way of example only, and is not intended to limit the true scope of this invention as claimed.

Referring now to FIG. 3, multi-carrier spread spectrum wireless base station 15 constructed according to the preferred embodiment of the invention will now be described in detail. As well known in the art, wireless base stations both transmit and receive signals, and as such wireless base station 15 of FIG. 3 includes both a transmit and a receive side. This invention is implemented into the transmit side of wireless base station 15, as will be described below. Receiver circuitry 28 in wireless base station 15 may be implemented by conventional receiver functions and circuitry, in the manner well known in the art.

On the transmit side of wireless base station 15, multiple communications channels are encoded in the conventional fashion by each of multiple codecs $10_1$ through $10_m$. As described above relative to the Background of the Invention, each codec $10_i$ encodes multiple channels, preferably by applying an orthogonal spreading code to each channel in CDMA fashion. The output of each codec $10_i$ is thus a baseband time-domain signal corresponding to the summed CDMA channels that is mixed with a carrier frequency to produce a CDMA modulated carrier, occupying on the order of 5 MHz of bandwidth, and centered at the modulated carrier frequency. These signals from codecs $10_1$ through $10_m$ are then summed by summing circuit 12, to produce a broadband multi-carrier time domain signal, in the form of a symbol stream.

Digital upconverter 14 is a conventional circuit function for converting the time-domain symbol stream from codecs 10 via summing circuit 12 into a time domain signal at a sample rate corresponding to correspond to the transmission frequency. An example of a conventional digital upconverter suitable as digital upconverter 14 is the GC4116 quad digital upconverter available from Texas Instruments Incorporated. Digital upconverter 14 preferably performs such additional functions as signal shaping, channel stacking, and the like. As known in the art, digital upconverter 14 performs the upconverting of the summed time-domain signal to the desired frequency by interpolating the incoming symbol stream, typically by the application of digital interpolation filters.

According to the preferred embodiment of the invention, the output of digital upconverter 14 is received by peak compression unit 16, which performs crest factor reduction, or peak compression, on the symbol stream to reduce the amplitude of peak samples in the transmitted stream, and thus reduce the peak-to-average power ratio (PAR). The detailed construction and operation of peak compression unit 16 will be described in further detail below. As shown in FIG. 3, base station 15 also includes processor 18 which assists in the control and operation of wireless basestation 15 in general, and peak compression unit 16 specifically. Processor 18 may be a conventional microprocessor, or digital signal processor (DSP), having sufficient computational capacity for carrying out the functions described below. An example of a conventional device suitable for use as processor 18 is a DSP such as the TMS320C6000 family of digital signal processors available from Texas Instruments Incorporated.

The output of peak compression unit 16 is converted to the analog domain by digital-to-analog converter (DAC) 20. Various digital filters may be implemented prior to DAC 20, as well as various analog filters after conversion of the transmit signal to the analog domain, as known in the art. The analog signal is then converted to an radio frequency (RF) signal in the conventional manner by RF upconverter 22, based on the desired RF frequency from local oscillator 23. Power amplifier 24 amplifies this RF signal to be transmitted, including the corresponding CDMA multiple carrier symbol streams, to the desired power level, and applies the transmit signal to antenna A via duplexer 26. This embodiment of this invention can support up to 20 MHz of modulation bandwidth equating to four carriers in WCDMA and fifteen carriers in CDMA2000; it is further contemplated that a dual antenna mode can be supported, in which two streams of up to 10 MHz bandwidth each is supported for two UMTS carriers or seven CDMA2000 carriers.

Referring now to FIG. 4, the construction of peak compression unit 16 according to the preferred embodiment of the invention will now be described in detail. It is preferred that peak compression unit 16 be constructed in the form of an integrated circuit co-processor, such that its functionality is self-contained within a single integrated circuit that may be included within base station 15. It is also contemplated that peak compression unit 16 may alternatively be implemented as part of an overall larger-scale integrated circuit that also performs other functions within base station 15, or further in the alternative as a sequence of program instructions executable by a general purpose microprocessor or a DSP. Further in the alternative, it is also contemplated that peak compression unit 16 may be implemented in an integrated circuit by way of a field programmable gate array (FPGA), or by a general purpose microprocessor, DSP, or other programmable logic circuit or device, that executes a software routine that performs the peak compression functions described herein. The specific implementation will, of course, largely depend upon the technologies available for realization of peak compression unit 16, and upon the desired performance of base station 15, cost constraints, and the like.

As shown in FIG. 4, peak reduction unit 16 includes downsampler 30, which receives the interpolated spread spectrum symbol stream from digital upconverter 14. Downsampler 30 increase the flexibility for the system designer, in determining the input signal sample rate that is applied to peak reduction unit 16 and the rate of the data stream through base station 15. According to the preferred embodiment of the invention, optimum performance is attained by an input signal sample rate that is approximately three times the signal bandwidth, or typically four times the base chip rate.

According to the preferred embodiment of the invention, peak compression unit 16 includes a sequence of peak detection and cancellation circuits 32, each of which process the signal stream to detect and cancel peak amplitude samples. As mentioned above in connection with the Background of the Invention, conventional peak suppression techniques cancel peak sample amplitudes, but may create new peaks when summed into their neighboring sample values. This effect has been referred to as "peak regrowth". According to this preferred embodiment of the invention, multiple passes of peak detection and cancellation are incorporated by the sequence of peak detect and cancellation circuits 32, so that peak regrowth that may occur in a first or early peak detection and cancellation operation is corrected by a later peak detection and cancellation pass.

The number of peak detection and cancellation circuits 32 in the sequence within peak compression unit 16 may of course vary. It is contemplated that, while a large number of peak detection and cancellation circuits 32 will provide optimum peak compression, at some point the peak reduction improvement provided by each stage in the sequence will diminish. In other words, there will be an optimum number of peak detection and cancellation circuits 32 in the sequence for each base station realization, considering the chip cost of additional peak detection and cancellation circuits 32, as well as the performance penalty arising from the necessary lag of the signal as it is processed by peak compression unit 16. According to the preferred embodiment of the invention, in its exemplary realization as shown in FIG. 4, four peak detection and cancellation circuits $32_1$ through $32_4$ are implemented in sequence in peak compression unit 16, following downsampler 30. For modem wireless base stations, it is expected that three or four peak detection and cancellation circuits 32 will generally be adequate.

Each of peak detection and cancellation circuits $32_1$ through $32_4$ are preferably constructed identically to one another. The input of first peak detection and cancellation circuit $32_1$ receives the downsampled symbol stream from downsampler 30. The output of peak detection and cancellation circuit $32_1$ is connected to the input of peak detection and cancellation circuit $32_2$, the output of peak detection and cancellation circuit $32_2$ is connected to the input of peak detection and cancellation circuit $32_3$, and so on, with the output of the last one of peak detection and cancellation circuits 32 (which is peak detection and cancellation circuit $32_4$ in the example shown in FIG. 4) providing the output of the symbol sequence with its peaks compressed. This identity and interconnection thus implements multiple independent passes of peak detection and correction on the symbol stream, with each peak detection and cancellation circuit 32 operating independently from the others.

Referring now to FIG. 5, the construction and operation of an exemplary and representative peak detection and cancellation circuit $32_j$ will now be described in detail. As mentioned above, it is contemplated that each of peak detection and cancellation circuits $32_1$ through $32_4$ in peak compression unit 16 according to this embodiment of the invention will be similarly constructed.

Peak detection and cancellation circuit 32 receives each input symbol on lines IN. As apparent from FIG. 4, lines IN may be received from a preceding peak detection and cancellation circuit 32, or in the case of first peak detection and cancellation circuit $32_1$, from downsampler 30. Each input symbol is forwarded in sequence to matching delay circuit 44, and also to peak detector circuit 40. Matching delay circuit 44 stores the sequence of samples, and forwards the received samples to adder 40, after a matching delay time as determined by peak detector 40. Adder 40 applies one or more correction values to the forwarded symbol, as determined by one or more cancellation pulse generators 42. Matching delay circuit 44 synchronizes the received symbols with the outputs of cancellation pulse generators 42, according to the location of the peaks determined by peak generator 40, so that the appropriate corrections are properly applied.

According to the preferred embodiment of this invention, peak detector 40 determines the presence of peak values in the received symbol stream, relative to one or more thresholds; for each detected peak, peak detector 40 identifies the temporal location of the peak, and its magnitude of each peak (both in-phase and quadrature-phase magnitudes, in the case of complex symbol streams). Peak detector 40 forwards the location and magnitude information to an appropriate cancellation pulse generator 42. Each cancellation pulse generator 42 derives a cancellation pulse for a detected peak, based on this location and magnitude information. According to the preferred embodiment of the invention, the cancellation pulse is applied to the sample value at the peak itself, and also over its neighboring peaks, to smooth the cancellation and thus comply with the signal-to-noise limits and spectral mask requirements for the transmitted signal. Because more than one peak may be detected in the incoming symbol stream within a relatively short time window, multiple cancellation pulse generators $42_1$ through $42_k$ are provided in peak detection and cancellation circuit $32_j$, so that these multiple corrections can be handled in an overlapping or simultaneous manner. In a preferred example, four such cancellation pulse generators $42_1$ through $42_4$ are implemented. If additional peaks are detected by peak detector circuit 40, beyond the k cancellation pulse generators $42_1$ through $42_k$, peak detector 40 provides at least a count of such additional peaks, and perhaps also the location and magnitude of the detected peak, to unprocessed peak counter 35 (FIG. 4).

Figure 6:
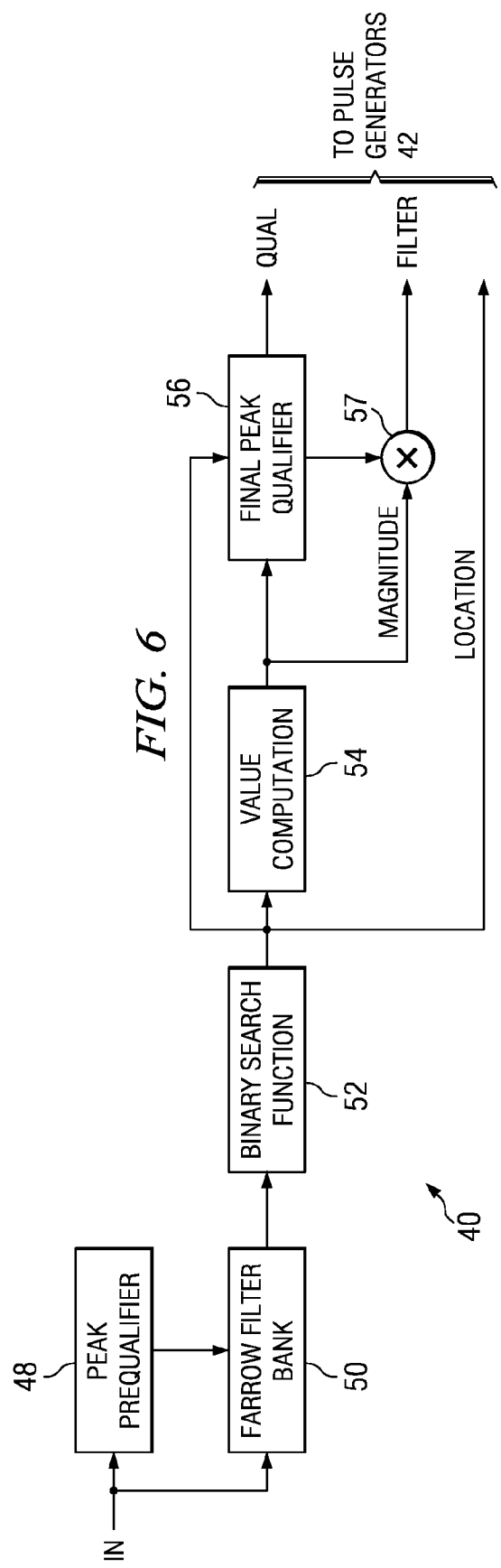
FIG. 6 is an electrical diagram, in block form, of a peak detection circuit in the peak detection and cancellation circuit of FIG. 5, according to the preferred embodiment of the invention.

Referring now to FIG. 6, the construction of peak detector 40 according to the preferred embodiment of the invention will now be described in detail. The input symbol stream on lines IN is received by peak pre-qualifier 48, and also by Farrow filter bank 50. Peak pre-qualifier 48 receives each incoming sample, and performs a simple test on the symbol magnitude to determine whether that sample amplitude can (or may likely) correspond to a peak. The determination performed by pre-qualifier 48 may simply correspond to a comparison of the magnitude (complex magnitude, for complex symbols) of the current sample X(k) relative to its preceding neighboring sample X(k−1) and its next neighboring sample in time X(k+1):

$$X(k-1)X^*(k-1) < X(k)X^*(k) >= X(k+1)X^*(k+1)$$

where * indicates the complex conjugate. If this condition is not satisfied for current symbol X(k), then a peak is not at or near this sample, and peak detector 40 waits for the next sample value to arrive. If this condition is satisfied for current sample X(k), peak detector 40 operates on this current sample X(k), beginning with Farrow filter bank 50. This particular current sample X(k) may be at or near a peak value, considering that its magnitude is higher than its neighbors, but of course it may not be a peak that requires suppressing, depending upon the magnitude of the peak.

Farrow filter bank 50 receives the current sample X(k), and if this symbol has been pre-qualified as a potential peak by pre-qualification circuit 48, effectively applies a local curve-fitting interpolating filter to current sample X(k). It is contemplated that this interpolating filter function may instead follow any well-known approach, including quadratic, cubic, or a polynomial curve-fitting technique other than the Farrow approach. According to the preferred embodiment of the invention, the curve fitting is implemented by Farrow filter bank 50, to take advantage of the well-known attributes of the Farrow filter, namely in providing arbitrary interpolation of sampled data, and thus a high degree of interpolation accuracy.

Farrow filter bank 50 produces a set of polynomial coefficients that fit the neighborhood of the sample stream at time k, over a range that is ±½ sample period on either side of the current symbol X(k). This polynomial is preferably a polynomial in d, where d is a variable corresponding to a fractional delay in this range. According to this preferred embodiment of the invention, the polynomial produced by Farrow filter bank 50 is of quadratic order, and thus Farrow filter bank 50 produces three polynomial coefficients C2, C1, C0, generated from a desired number of sample points including and surrounding current symbol X(k); this corresponds to an interpolating quadratic polynomial $C2*d^2+C1*d+C0$ over that interval. Farrow filter bank 50 may therefore correspond to a digital filter, having a number of taps corresponding to the number of samples used. For example, it is contemplated that a seven-tap digital filter involving seven sample values (ranging from symbol X(k+3) to symbol X(k−3) in the input symbol stream) may be used in base station 15 according to this preferred embodiment of the invention. In this event, Farrow filter bank 50 will utilize three sets (one for each coefficient) of seven filter coefficients (one for each sample) to produce the polynomial coefficients for the estimate of the sampled symbol stream in the range X(k−½) to X(k+½). As known in the art, Farrow filter coefficients do not vary, and as such may be calculated in advance and stored. For the quadratic Farrow filter bank 50 having seven taps, exemplary coefficients are:

| 0 | 0 | 0 | 1.0000 | 0 | 0 | 0 |
|---|---|---|---|---|---|---|
| 0.0313 | −0.1719 | 0.7656 | 0 | −0.7656 | 0.1719 | −0.0313 |
| 0.0469 | −0.2188 | 0.9844 | −1.6250 | 0.9844 | −0.2188 | 0.0469 |

These coefficients may be normalized as desired for ease of implementation. It has also been observed, in connection with this invention, that a five tap filter may be used to realize Farrow filter bank 50, if appropriate optimization is implemented. An example of the coefficients for such a five tap filter, normalized to integer values, is:

| 0 | 0 | 64 | 0 | 0 |
|---|---|---|---|---|
| −7 | 45 | 0 | −45 | 7 |
| −14 | 68 | −112 | 68 | −14 |

It is also preferred that Farrow filter bank 50 introduces extremely low distortion (e.g., on the order of −46 dB) and that aliasing frequencies are effectively eliminated (e.g., less than about −56 dB from the passband. It is contemplated that those skilled in the art having reference to this specification will be readily able to implement Farrow filter bank 50 as appropriate for the particular base station application.

As shown in FIG. 6, the polynomial coefficients from Farrow filter bank 50 are applied to binary search function 52, which operates to locate the peak of the approximating polynomial in the time-domain interval X(k−½) to X(k+½), and to evaluate the polynomial at that point. It is contemplated that various approaches may be used to perform the location and evaluation of the peaks that is performed by binary search function 52 in this embodiment of the invention. These alternative approaches including conventional root-finding, such as Newton-Raphson root finding, may be used in place of binary search function 52. However, it is considered that a binary search is preferable because of its simplicity, efficiency, and compatibility with the output of Farrow filter bank 50.

Figure 7A:
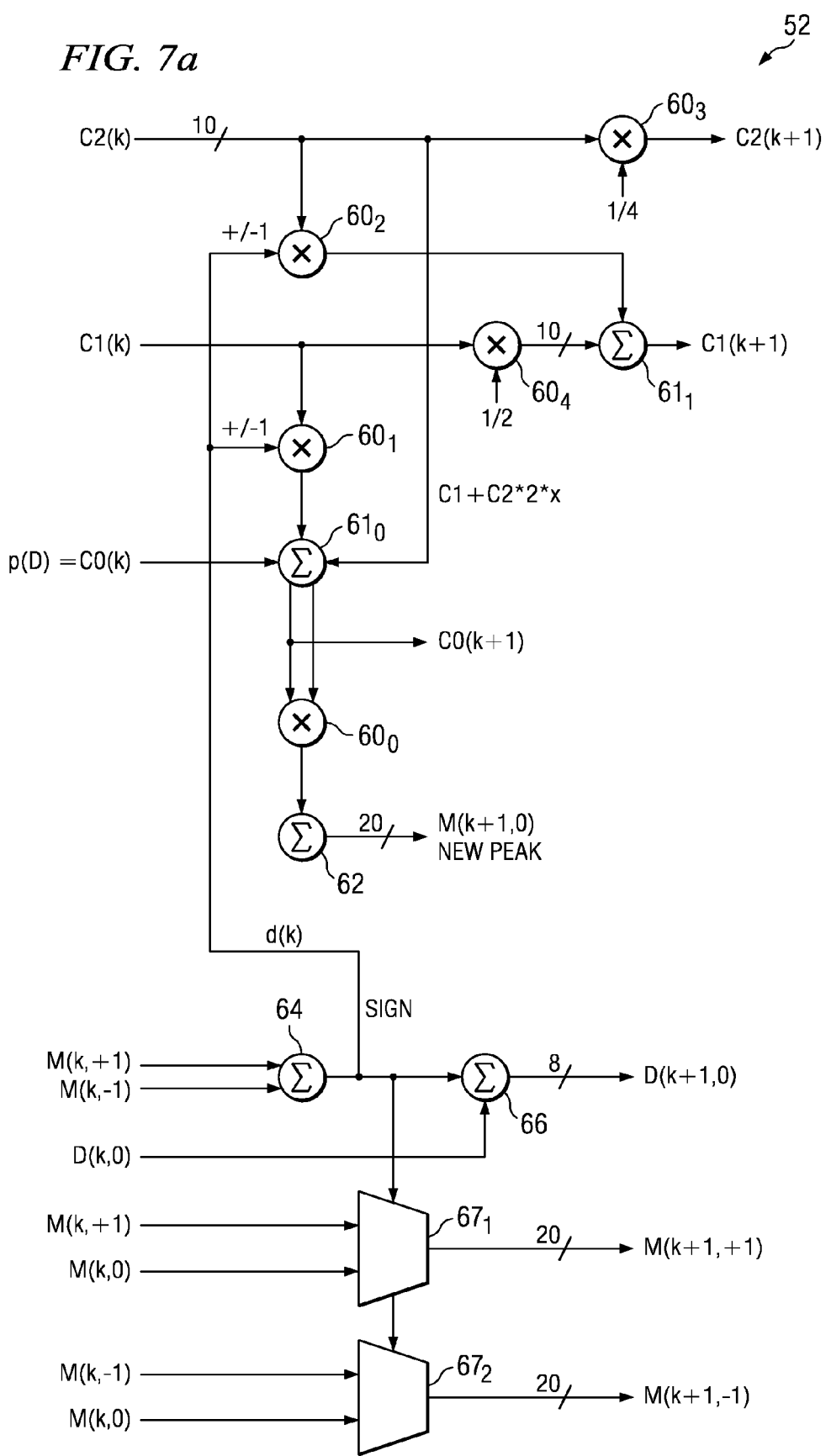
FIGS. 7a and 7b are electrical diagrams, in block form, of a binary search function and a value computation function, respectively, in the peak detection circuit of FIG. 6, according to the preferred embodiment of the invention.

FIG. 7a illustrates the construction of binary search function 52 according to the preferred embodiment of the invention. As before, it is contemplated that binary search function 52 may be implemented by way of specific logic circuitry, as shown in FIG. 7a, or alternatively by way of a software program that is executable by a more general purpose logic circuit or processor. In any event, binary search function 52 operates in an iterative fashion to locate and evaluate the peak within the interval. For purposes of this description, iteration index k will identify the particular iteration of interest.

Binary search function 52 effectively performs two functions within each binary search iteration. One of these functions is the selection of one half of the current interval in the $k^{th}$ iteration as the interval for the next $(k+1)^{th}$ iteration, depending upon an estimate of the slope of the interpolating polynomial function:

$$C2*d(k,0)^2+C1*d(k,0)+C0$$

over the current interval. Preferably, the interval in the $k^{th}$ iteration is normalized to extend from delay value d=−1 to delay value d=+1, with the midpoint thus being at d=0; this normalization greatly eases evaluation of the interpolating polynomial at the endpoints and midpoint, and also eases the determination of the next interval points.

Selection of the next interval is made by comparator 64, which receives endpoint magnitudes M(k,−1), M(k,+1), which have been previously calculated from the approximating polynomial at the endpoints (d=−1, d=+1) of the current $k^{th}$ iteration. The sign output from comparator 64, which indicates which of current endpoint magnitudes M(k,−1), M(k,+1) are larger, is the control input to multiplexers $67_1$, $67_2$. Multiplexer $67_1$ receives endpoint magnitude M(k,+1) and midpoint magnitude M(k,0) at its inputs and selects one of these inputs as endpoint magnitude M(k+1,+1) for the next $(k+1)^{th}$ iteration, and multiplexer $67_2$ receives endpoint magnitude M(k,−1) and midpoint magnitude M(k,0) at its inputs and selects one of these inputs as endpoint magnitude M(k+1,−1) for the next $(k+1)^{th}$ iteration. As such, if endpoint magnitude M(k,−1) is greater than endpoint magnitude M(k,+1), multiplexers $67_1$, $67_2$ select magnitudes M(k,0) and M(k,−1) as next interval endpoint magnitudes M(k+1,+1) and M(k+1,−1), respectively. Conversely, if endpoint magnitude M(k,−1) is less than endpoint magnitude M(k,+1), multiplexers $67_1$, $67_2$ select magnitudes M(k,+1) and M(k,0) as next interval endpoint magnitudes M(k+1,+1) and M(k+1,−1), respectively. In addition, delay value updater 66, effectively adds ±½ (half of the current interval width) to the current delay midpoint d(k,0) (which is 0 in the normalized interval) as the midpoint location d(k+1,0) for the next $k+1^{th}$ iteration.

The second function of binary search function 52 is to determine the polynomial coefficients C0, C1, C2 for the next $(k+1)^{th}$ iteration, using with the current polynomial coefficient values C0(k), C1(k), C2(k) (the first $0^{th}$ iteration of which were generated by Farrow filter bank 50) and the result from comparator 64. In theory, the coefficient C2(k+1) for the next $(k+1)^{th}$ iteration corresponds to the second derivative of the interpolating polynomial evaluated at the midpoint d(k+1,0) for the next interval, the next coefficient C1(k+1) corresponds to the first derivative of the interpolating polynomial evaluated at the midpoint d(k+1,0) for the next interval, and the next coefficient C0(k+1) corresponds to the interpolating polynomial itself, evaluated at that next midpoint d(k+1,0). These coefficients may all be in complex space, and are preferably normalized or scaled so that each interval ranges from d=−1 to d=+1, with the midpoint at d=0, as mentioned above. Accordingly, binary search function 52 includes multiplier $60_3$, which receives the current coefficient value C2(k) and scales this current coefficient by ¼ (effectively a two-bit binary shift), to produce next coefficient C2(k+1). The current coefficient value C2(k) is multiplied by ±1 (i.e., the sign bit from comparator 64) at multiplier $60_2$, and this value is applied to adder $61_1$, along with one-half the current coefficient C1(k) value as produced by multiplier $60_4$; the output of adder $61_1$ is the next coefficient C1(k+1). The next coefficient C0(k+1) is generated at the output of adder $61_0$, which receives ±C1(k) from multiplier $60_1$ (depending on the sign bit from comparator 64), current coefficient value C2(k), and current coefficient value C0(k). Multiplier $60_0$ and adder 62 combine the real and imaginary components of next coefficient C0(k+1) from adder $61_1$ to derive the new peak magnitude M(k+1,0), for the next $(k+1)^{th}$ iteration.

Figure 8A:
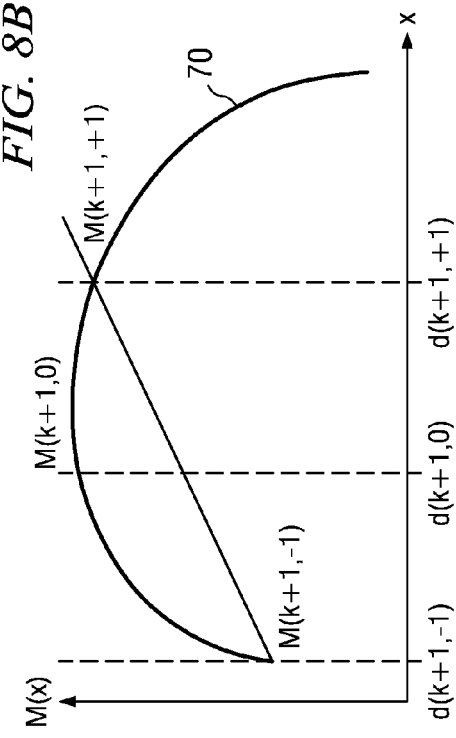
FIGS. 8a through 8d are plots of polynomial interpolation estimates, illustrating the operation of the binary search function of FIG. 7 according to the preferred embodiment of the invention.

The operation of binary search function 52 will now be explained in connection with an example illustrated in FIGS. 8a through 8d. As shown in FIG. 8a, curve 70 refers to a quadratic polynomial curve that is defined by coefficients C0, C1, C2 from Farrow filter bank 50, and which provides an analog interpolation in the time-domain interval X(k−½) to X(k+½) about current sample point X(k). As mentioned above, Farrow filter bank 50 may effectively apply a transformation by one-half the sample period, so that the current sample point resides at one endpoint of the sample interval. In any event, curve 70 in FIG. 8a extends, along the delay time x axis, from a delay point d(k,−1) to d(k,+1), in the $k^{th}$ iteration of the binary search. Test point d(k,0) in this $k^{th}$ iteration is at the midpoint between delay points d(k,−1) to d(k,+1). For the $0^{th}$ iteration (k=0), the interval from d(k,−1) to d(k,+1) preferably matches the interval X(k−½) to X(k+½). The magnitude of polynomial curve 70 is evaluated (or previously was evaluated) at each delay points d(k,−1) and d(k,+1), to provide magnitudes M(k,−1) and M(k,+1). These magnitudes are preferably normalized to a range suitable for use during the binary search operation, with the true peak magnitude calculated later. The evaluation of magnitudes M(k,−1) and M(k,+1) may be performed by way of multipliers 60, adders 61, 62 of binary search function 52 (FIG. 7a), or by other circuitry.

In addition, the magnitude M(k,0) at test point d(k,0) was previously evaluated in the previous iteration by multipliers 60, adders 61, and operator 62 of binary search function 52, using the current coefficient values C0(k), C1(k), C2(k) that were also generated in that iteration, as described above. In this regard, the output of adder $61_0$ provides the in-phase (real) and quadrature-phase (imaginary) components of the magnitude M(k,0) for use in the generation of the compensation pulse, as will be described in further detail below. The magnitude M(k,0) as an absolute value is generated by multiplier $60_0$ and adder 62, as mentioned above, and is fed into inputs of multiplexers $67_1$ and $67_2$.

Magnitudes M(k,−1) and M(k,+1) at delay points d(k,−1) and d(k,+1) are applied to comparator 64, which generates a sign output indicating which of magnitudes M(k,−1) and M(k,+1) is larger. In effect, the sign output from comparator 64 reflects the polarity of the slope of line $72_k$ between magnitudes M(k,−1) and M(k,+1) at delay points d(k,−1) and d(k,+1), shown in FIG. 8a.

As mentioned above, the sign output from comparator 64 establishes the position of the next interval in the binary search. In the example of FIG. 8a, the slope is negative because magnitude M(k,−1) is greater than magnitude M(k,+1). According to this binary search approach, the slope at current test point d(k,0) is estimated to be equal to (or at least the same polarity as) the slope between the two endpoints d(k,−1) and d(k,+1). Accordingly, the next interval to be examined will be that between current delay points d(k,−1) and d(k,0), because the negative slope indicates that the true peak in curve 70 is between those two points.

Multiplexers 67 in binary search function 52 then set up the next $(k+1)^{th}$ iteration of the binary search routine, in response to the polarity of the slope determined by comparator 64. Multiplexer $67_2$ derives the evaluated magnitude M(k+1,−1) at the next lower interval limit d(k+1,−1) from either of magnitudes M(k,−1) and M(k,0); in this example, magnitude M(k,−1) is selected by multiplexer $67_2$ to serve as magnitude M(k+1,−1), considering that delay time d(k,−1) is selected as the next lower interval limit d(k+1,−1). Similarly, multiplexer $67_1$ derives the evaluated magnitude M(k+1,+1) at the next higher interval limit d(k+1,+1) from either of magnitudes M(k,0) and M(k,+1); in this example, magnitude M(k,0) is selected by multiplexer $67_1$ for magnitude M(k+1,+1). In addition, adder 66 generates the next test point d(k+1,0) from the previous test point d(k,0), by either adding or subtracting a known increment (i.e., ½) for the iteration.

Figure 8B:
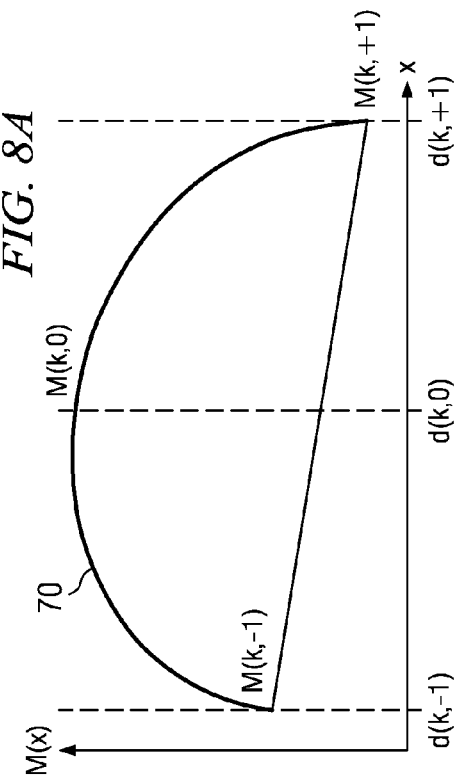
Figure 8C:
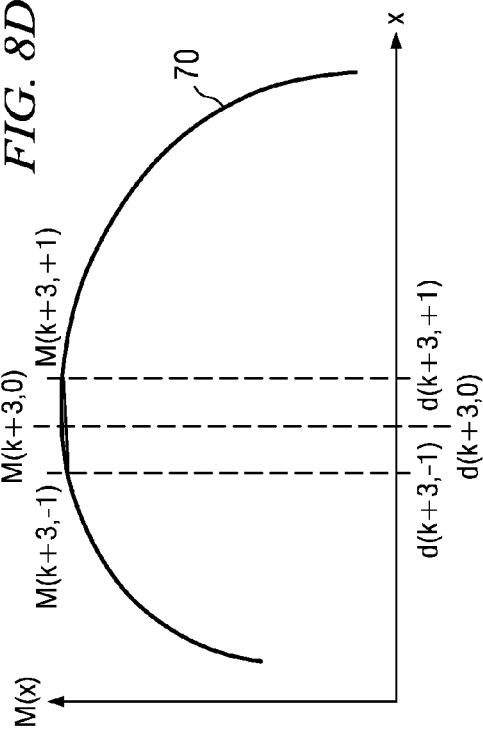
Figure 8D:
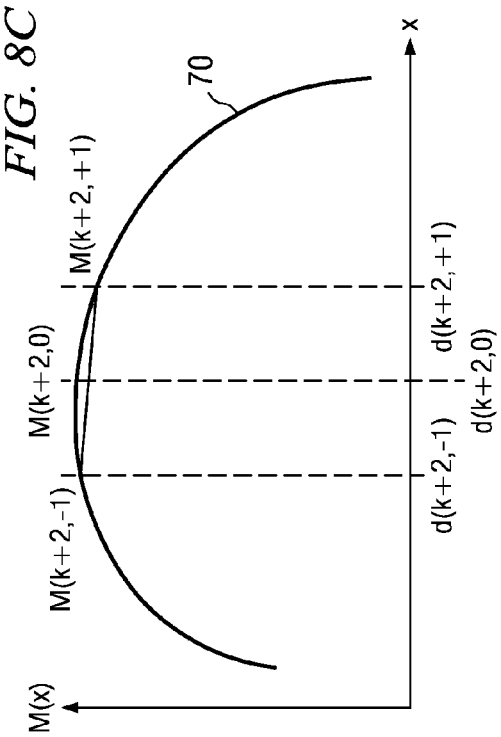

FIG. 8b illustrates the position of the next $(k+1)^{th}$ interval following the $k^{th}$ interval shown in FIG. 8a. The next set of calculations are then performed again by binary search function 52. In this example, the slope of magnitudes M(k+1,−1) and M(k+1,+1) is positive, which will cause the next $(k+2)^{th}$ interval to be positioned between delay times d(k+1,0) and d(k+1,+1), as shown in FIG. 8c. FIG. 8d illustrates the result of the next iteration of binary search function 52, operating on the interval between delay times d(k+2,−1) and d(k+2,+1), resulting in the $(k+3)^{th}$ interval being between delay times d(k+2,−1) and d(k+2,0).

This iterative binary search process continues until a termination criterion is met. Because the polynomial in this example is well-behaved and has a single root (i.e., is quadratic), binary search function 52 may simply operate over a fixed number of iterations. Alternatively, if desired, the actual value of the slope (output by comparator 64) may be tested against a limit, after the completion of a specified number of iterations. In any event, upon completion of the final iteration, operator 66 of binary search function 52 presents the delay time location of the estimated peak along the time or delay axis, and adder 60 presents the real and imaginary component values of the interpolating polynomial, and thus an estimated value of the signal stream, at that peak delay time.

In the alternative to binary search function 52, other peak location techniques may be used. Examples of these techniques include an alternative inverse computation approach in which a cordic-like reduction algorithm may be used, or by executing a closed solution to the roots of a polynomial. The binary search technique is preferable, however, because it can be carried out without multiplicative inverses (which would require the implementation of look-up tables or complex circuitry), and because most multiplications are powers of two, which are efficient for digital implementations.

Referring back to FIG. 6, a value corresponding to the squared peak magnitude is communicated from binary search function 52 to final peak qualifier 56, for comparison with a detection threshold $T_d$ to determine whether the peak qualifies as a peak that is to be cancelled. If this peak criterion is met, further processing progresses with one of pulse generators 42 operating to reduce the identified and qualified peak, as will be described in further detail below.

Figure 7B:
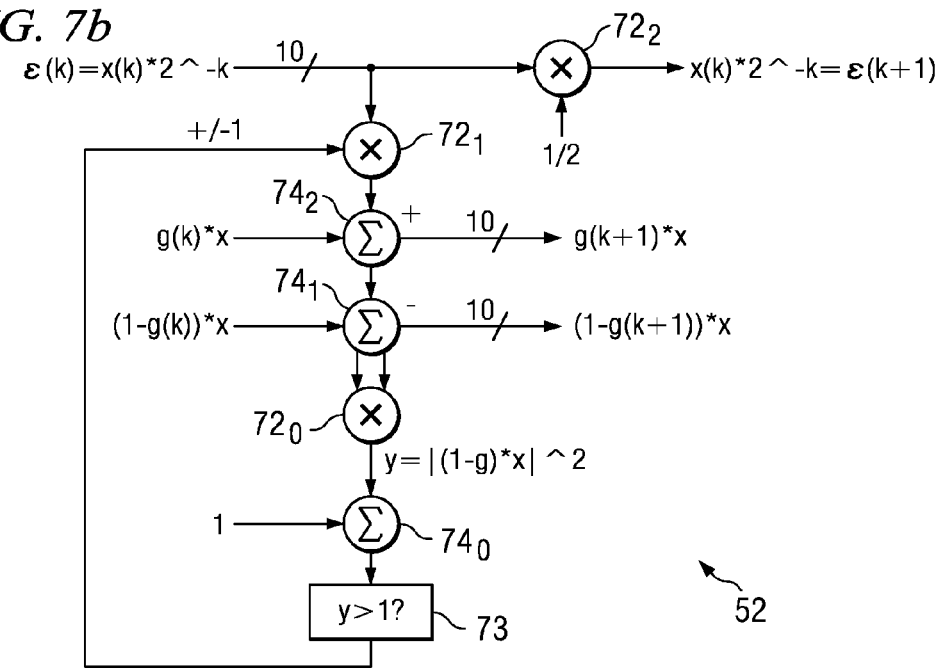
Figure 13:
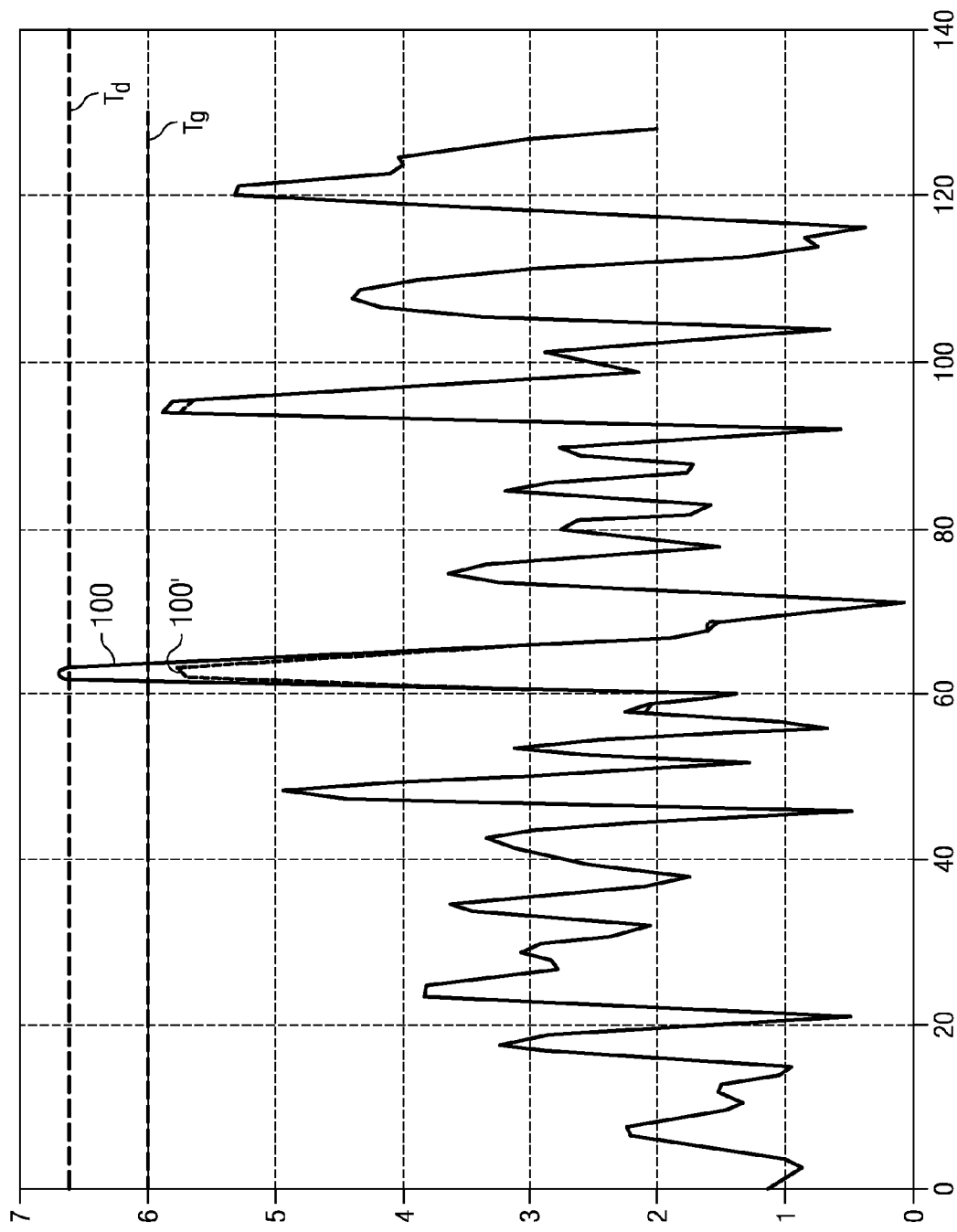
FIG. 13 is a plot of a signal stream, illustrating the relationship of peak detection and peak correction, or gain scaling, thresholds relative to the signal stream.

Also as shown in FIG. 6, the peak delay time, or location, and also the complex value of this peak value, identified by binary search function 52 are forwarded to value computation function 54, which calculates the gain to be applied, filtered and subtracted from that identified peak in the sampled signal stream. According to this embodiment of the invention, value computation function 54 simply computes a gain g that scales the peak value for use in the pulse generator. Preferably, this gain is computed so that $|x(d)-g \cdot x(d)|=T_g$, where $T_g$ is the peak crest factor allowed in amplitude, where gain g is the smallest real value that satisfies this equation, and where x(d) is the complex sample value at the identified peak position. According to the preferred embodiment of the invention, as shown in FIG. 7b, value computation function 54 is implemented by way of a sequence of multipliers and adders, as will now be described in connection with an exemplary implementation. Of course, other realizations of value computation function 54 are also contemplated, and will be apparent to those skilled in the art having reference to this specification. For flexibility in the operation of the device, the detection threshold $T_d$, may be different from the gain threshold $T_g$, as shown in FIG. 13.

In value computation function 54, an adjustment ϵ(k) based on the original function value x(k) is applied to the gain g(k) in each iteration. The equation $|x(d)-g \cdot x(d)|=T_g$ is evaluated for each iteration, and the gain g is adjusted by this adjustment for the next iteration, depending upon whether gain g is too large or too small. This adjustment ϵ(k) is halved in each iteration, so that ϵ(k+1)=ϵ(k)/2, or in general:

$$\epsilon(k)=x(k)2^{-k}$$

Multiplier $72_2$ multiplies the current adjustment value ϵ(k) by ½ in each iteration, producing the next adjustment value ϵ(k+1). Multiplier $72_1$ multiplies the current adjustment value ϵ(k) by ±1, depending upon the result of decision 73 from the previous iteration (i.e., the polarity of the comparison of $|x(d)-g \cdot x(d)|$ with threshold $T_g$). The signed adjustment from multiplier $72_1$ is applied to adder $74_2$, which receives the current pulse gain value g(k)*x, and thus produces the next iteration of pulse gain value g(k+1)*x at its output. The updated pulse gain value g(k+1)*x from adder $74_2$ is applied at a subtracting input of adder $74_1$. Adder $74_1$ receives the current iterative value of the cancellation pulse, expressed as ((1−g(k))*x at its input, and thus produces the next iterative cancellation pulse value ((1−g(k+1))*x at its output (in real and imaginary components), after the updated pulse gain value g(k+1)*x from adder $74_2$ is applied. Multiplier $72_0$ and adder $74_0$ determine the magnitude y of the new cancellation pulse value ((1−g(k+1))*x, and apply this magnitude to decision 73, which determines whether the gain g should be increased or decreased in the next iteration, by comparing the magnitude against threshold T (or unity, in the preferred case where the values are scaled). After a selected number of iterations, or upon adequate convergence, the pulse gain g as output by adder $74_2$ is output by value computation function 54, for application to the appropriate cancellation pulse generator 42 (FIG. 5).

Referring back to FIG. 6, not every peak in the symbol stream is of such magnitude as to require correction. According to the preferred embodiment of the invention, a threshold level is set, for example by processor 18 under user or program control, below which a peak is not to be corrected but above which the peak value is to be corrected. The threshold peak level is preferably expressed as a power level, permitting it to be directly compared against the magnitude power value of the pulse, or alternatively the gain value evaluated by value computation function 54, by final peak qualifier function 56. A digital signal QUAL is produced by final peak qualifier function 56, indicating whether the currently identified location of a peak is or is not to be compensated for, or compressed, by pulse generators 42.

Figure 9A:
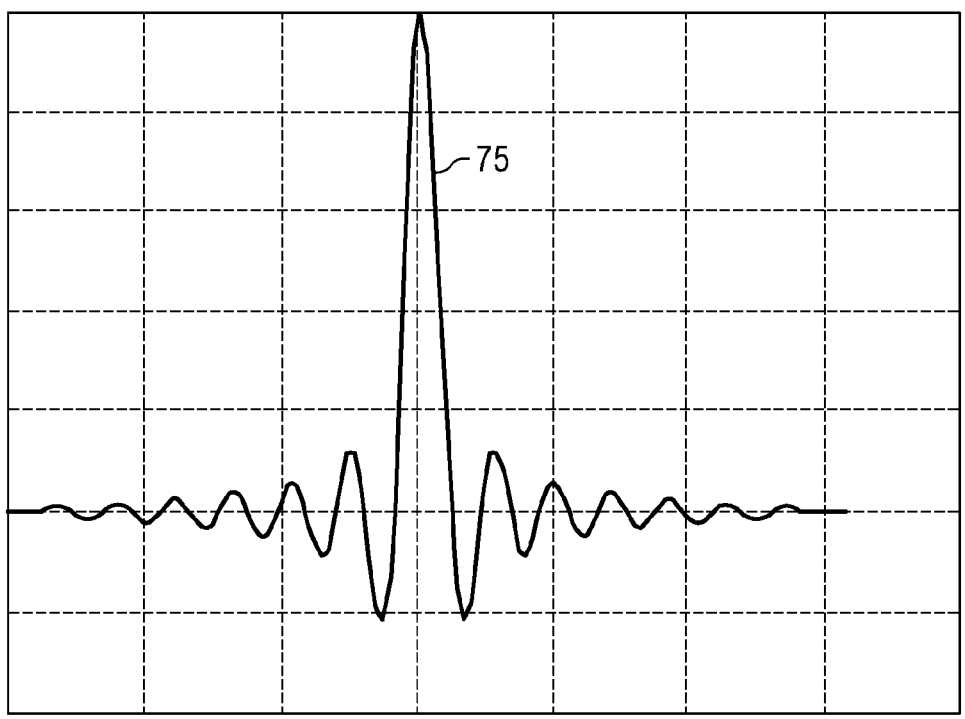
FIGS. 9a and 9b are plots illustrating exemplary peak cancellation pulses.
Figure 9B:
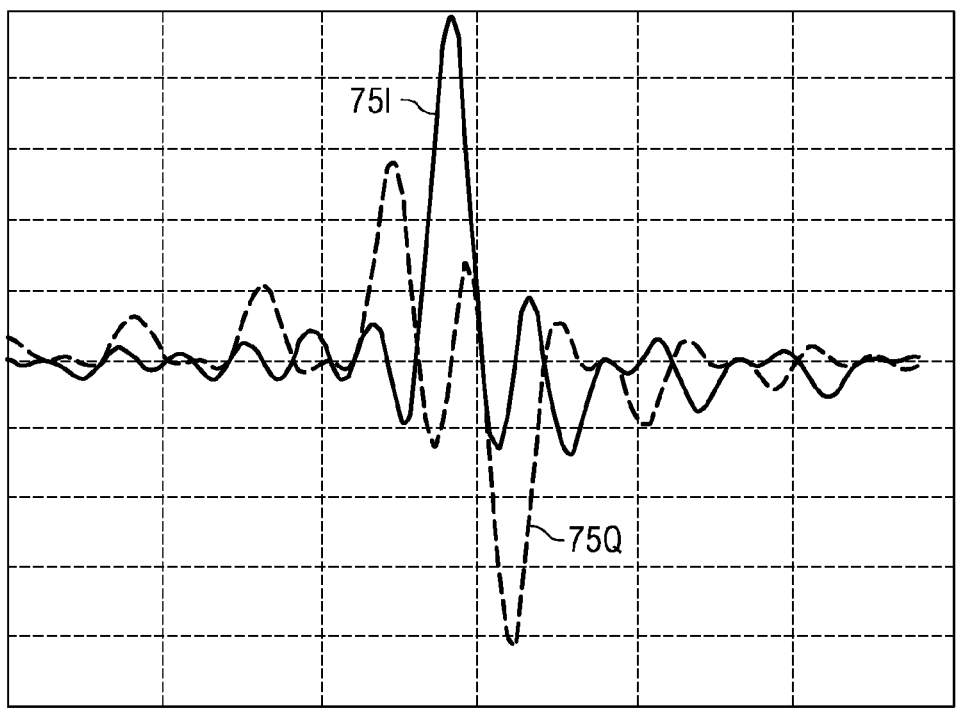

As known in the art, the eventual compensating pulse applied in crest factor reduction, or peak compression, is not merely a pulse applied to a single sample point, but extends over a range of neighboring points on either side of the peak sample point, to reduce wideband noise in the compressed signal that would result from the compression of a single point. An example of a real-valued peak compression pulse is illustrated in FIG. 9a. In this example, pulse 75 has a peak at a central sample point, which of course will correspond to the identified peak location determined by binary search function 52 (pulse 75 being subtracted from the signal being compressed). However, pulse 75 also has non-zero amplitudes at sample points on either side of its peak sample point. As evident from FIG. 9a, compression pulse 75 may extend over a large number of samples, as known in the art. FIG. 9b illustrates an example of a complex compression pulse, including real (in-phase) component 75I and imaginary (quadrature-phase) component 75Q. In either case, peak regrowth can result from the correction pulse amplitudes amplifying the sample amplitude at a nearby sample point so that it then exceeds the peak qualifying threshold, even if its amplitude did not exceed the peak qualifying threshold before the correction. In addition, some neighboring peaks that are initially above the peak qualifying threshold may be further amplified by the correction of a peak; conversely, the peak being corrected may be only slightly above the peak qualifying threshold and thus may be adequately corrected by the correction of a neighboring peak. To enable the selection of the largest peaks first, the detection thresholds $T_d$ may vary among peak detection and cancellation circuits $32_1$ through $32_4$, independently of the gain computation. This allows the earlier stages (e.g., peak detection and cancellation circuits $32_1$, $32_2$ in FIG. 4) to detect and process only the larger peaks. Generally, it is recommended that the gain threshold $T_g$ be set at the target peak-to-average in each of the processing stages 32.

According to an alternative embodiment of the invention, therefore, final peak qualifier function 56 is constructed and operates in a manner that reduces the likelihood of peak regrowth. In general, according to this alternative implementation, only the largest magnitude peak within a given range of samples (e.g., 100 samples) will be compensated. This ensures that the highest peak is compensated for once, and is not exacerbated by the correction of a preceding lower magnitude peak. It is believed that this alternative implementation is most clearly described relative to a flow diagram, presented in FIG. 10. It is contemplated that those skilled in the art having reference to this specification will be readily able to implement the appropriate logic circuitry for carrying out these operations.

In process 76, the location and magnitude for a first peak j is received and stored by final peak qualifier 56. A sample counter is then initialized in process 78. With each successive sample, final peak qualifier 56 will determine, in process 79, whether that sample has a qualifying peak (i.e., a magnitude above the peak qualifying threshold). If not, the current value of the sample counter is compared against a limit in decision 81, and if the limit is not yet reached (decision 81 is NO), the sample count is incremented in process 82 for receipt of the next sample. The sample count limit used in decision 81 is preferably on the order of the sample range over which the correcting pulse can have significant effect, for example on the order of one hundred samples).

If a qualifying peak is present at the current sample (decision 79 is YES), however, final peak qualifier function 56 then determines whether the magnitude (i.e., power) of this new peak j+1 is higher than that of the first peak j, in decision 83. If not (decision 83 is NO), then the sample count is tested in decision 81 as before. However, if the new peak j+1 is of higher magnitude (decision 83 is YES), then the location and magnitude of this new peak is stored at final peak qualifier function 56, in process 84. The location and magnitude of the previous peak j is effectively discarded, as this previous peak will not be compensated for, because of the nearby higher magnitude peak that was newly qualified. The sample count process then begins again from process 78, in which the sample count is re-initialized. The location and magnitude of the new peak that was stored in process 84 then effectively becomes peak j, and the process begins again.

If the sample count limit is reached without the receipt of a new, higher magnitude peak (decision 81 is YES), then the current stored value of the peak is the highest over the sample range. The location, and real and complex component values, of this peak j are then used in the construction and application of a compensating pulse.

According to this alternative approach, therefore, only the highest peak within a selected range is compensated. This minimizes the likelihood of peak regrowth, and also of the unintended amplification (rather than compensation) of frequent peak sample values.

Figure 10:
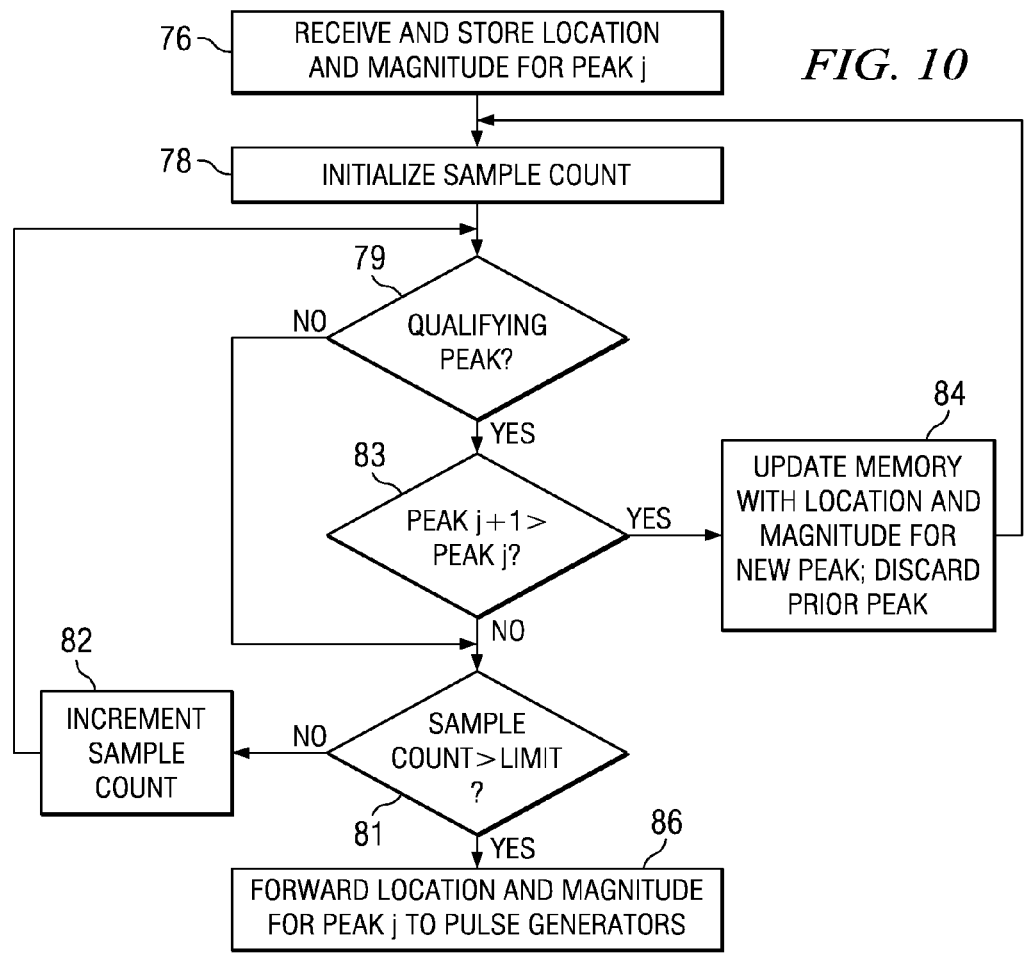
FIG. 10 is a flow diagram illustrating the operation of a peak qualifier circuit in the peak detection circuit of FIG. 6 according to an alternative preferred embodiment of the invention.

Referring back to FIG. 7, in either case (i.e., whether or not the sample window approach of FIG. 10 is used by final qualifier function 56), the power magnitude of the peak, as determined by value computation function 54, is used to derive a scaling factor for the compensating pulse to be applied. According to the preferred embodiment of this invention, the scaling factor is a complex factor that, when applied to a signal having a peak with the magnitude and phase at the identified location reduces the peak to a correction threshold. The correction threshold is preferably at a lower magnitude than that of the detection threshold, to provide additional immunity against peak regrowth and other effects. FIG. 13 illustrates an example of a signal stream 100 relative to detection, or peak qualifying, threshold $T_d$. The goal of peak compression unit is to scale the amplitude of peaks in signal stream 100 so that the resulting compressed peaks are at or below correction, or gain, threshold $T_g$, as is the case for corrected signal stream 100' in FIG. 13. As shown in FIG. 7, this scaling is derived by scaling multiplier 57, which receives the magnitude value from final peak qualifier 56 along with a gating signal indicating whether to generate a gain scaling factor because the current peak has in fact qualified for compensation. Scaling multiplier 57 may provide various output results to pulse generators 42 (FIG. 5). The scaling factor may simply be a scalar value:

$$\sqrt{MAG} - T_g / \sqrt{MAG}$$

where $T_g$ is the gain threshold, and where MAG is the magnitude (complex magnitude times its complex conjugate) at the peak, normalized to a scale of from 1 to 4, the peak qualifying threshold being 1. This scalar value may be applied to each of the real and imaginary (in-phase and quadrature-phase) components of the output from value computation function 54. Alternatively, the scaling value derived by scaling multiplier 57 may be taken from a look-up table with a predetermined non-linear gain versus peak magnitude characteristic. In either case, the output of scaling multiplier 57 is also forwarded to cancellation pulse generators 42, for use in deriving the proper amplitude and phase of the compensating pulse.

Referring back to FIG. 5, peak cancellation and detection circuit $32_j$ according to this embodiment of the invention includes multiple instances of cancellation pulse generators 42. For example, four such cancellation pulse generators 42 may be implemented within each peak cancellation and detection circuit $32_j$; of course, the number of pulse generators 42 may vary from one to more than four, depending upon the requirements of the particular application. Each cancellation pulse generator 42 is intended to generate and apply, via adder 46, a compensating pulse for a single qualifying peak, the location of which is determined by peak detection circuit 40. In addition, as described above, peak detection circuit 40 also receives a signal indicating the gain of the compensating pulse to be applied to the peak, as is also generated by peak detection circuit 40. The provision of multiple cancellation pulse generators 42 within each peak cancellation and detection circuit 32j thus permits the simultaneous compensation of multiple peaks in the symbol stream, without inserting undue latency into the transmission loop.

It is statistically possible that additional peaks are present in the sampled signal stream and are detected by peak detection circuit 40, beyond the number of available cancellation pulse generators 42. As shown in FIG. 4, unprocessed peak counter 35 receives signals from peak detection and cancellation circuit 32, indicating this event. In this manner, if a peak is detected and qualified by an upstream one of peak detection and cancellation circuits 32, it can be counted by unprocessed peak counter 35, and processed by a later peak detection and cancellation circuit 32 if capacity is present. This later processing can be performed in response to that unprocessed peak again being detected in the same manner as before, or alternatively by circuitry (not shown) that passes the location, qualification, and gain values to the downstream peak detection and cancellation circuit 32.

The construction and operation of each cancellation pulse generator 42 may follow any one of several alternative approaches. According to a first preferred embodiment of the invention, a Finite Impulse Response (FIR) digital filter is used to generate the pulse from a set of filter pulse values stored in a look-up table (LUT). Because of its FIR construction, this approach results in the generation of a symmetric compensating pulse, centered at the location of the qualifying peak detected by peak detection circuitry 40. An example of this construction of cancellation pulse generator 42 according to this first preferred embodiment of the invention will now be described in connection with FIG. 11.

Figure 11:
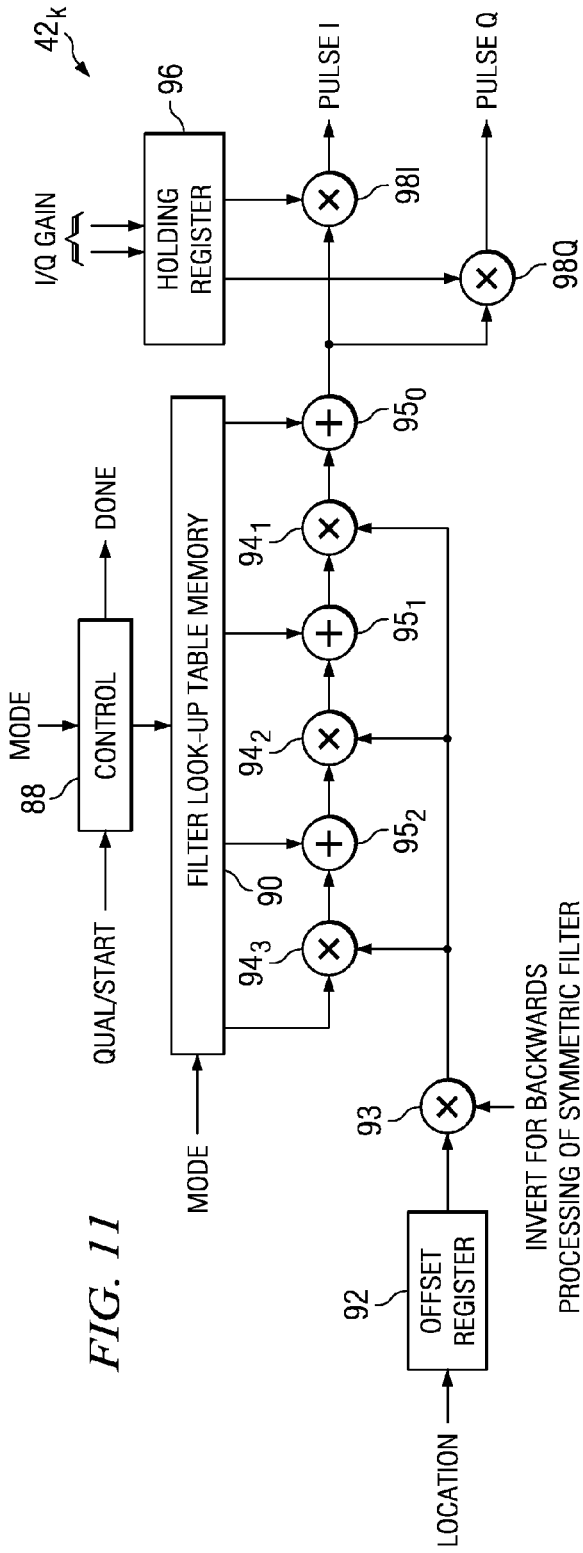
FIG. 11 is an electrical diagram, in block form, of a cancellation pulse generator in the peak detection and cancellation circuit of FIG. 5 according to the preferred embodiment of the invention.

As shown in FIG. 11, cancellation pulse generator $42_k$ receives several inputs. From peak detection circuit 40, as mentioned above, cancellation pulse generator $42_k$ receives signal LOCATION, which indicates the timing offset at which the detected peak is centered, signal QUAL, which indicates that this peak qualifies as a peak to be compensated and thus as trigger signal to cancellation pulse generator $42_k$ to begin generation of the pulse, and signals I/Q GAIN, which are the scaling factors for the in-phase and quadrature-phase components of the compensating pulse as described above. Cancellation pulse generator $42_k$ also receives other control and selection signals, for example from processor 18 via control interface 39 (FIGS. 3 and 4). These control and selection signals include mode selection signals MODE, considering that cancellation pulse generator $42_k$ may be capable of operating in a selected mode, for example providing a selectable pulse shape, length, or polynomial order. In this implementation, use of the LUT takes advantage of pulse symmetry; in addition, the ability to make fractional or integer strides through the LUT permits the LUT template to have a different implied sampling period from that of the signal processed.

According to this first preferred embodiment of the invention, control circuit 88 is provided in cancellation pulse generator $42_k$ for controlling its operation. Control circuit 88 initiates the generation of the pulse in response to signal QUAL indicating the detection of a qualifying pulse; preferably, control circuit 88 also issues a DONE signal to peak detection circuit 40 to indicate that cancellation pulse generator $42_k$ is no longer busy with the generation of a cancellation pulse for a peak, and is thus available to receive a new peak for processing. Control circuit 88 may also receive signal MODE from control interface 39, by way of which a particular operating mode is to be initiated. In response, control circuit 88 issues control signals to filter LUT memory 90, which stores the sample values for the cancellation pulse to be generated. As mentioned above, cancellation pulse generator $42_k$ may be operable according to various modes, including filter length, filter order, and pulse shape; the selection of such modes may be made by way of signal MODE applied to filter LUT memory 90 directly, or by control signals from control circuit 88.

In any event, filter LUT memory 90 has multiple outputs at which it produces pulse values from which the compensating pulse is generated. In this example, filter LUT memory 90 is arranged to generate up to a cubic, or third order, polynomial fit to the continuous representation of the desired pulse, and as such filter LUT memory 90 has four outputs for each of the four terms in the third order representation. One output is applied to an input of multiplier $94_3$, and the other three outputs are applied to an input of each of adders $95_2$ through $95_0$. These operators (multipliers 94 and adders 95, arranged in alternating sequence) produce the compensation pulse from the FIR values output by filter LUT memory 90 and the particular offset or timing location, as presented by offset register 92. This offset aligns the pulse with the location of the peak found, to maximize the cancellation effectiveness. Multiplier 93 forwards the contents of offset register 92 to multipliers $94_3$, $94_2$, $94_1$ either as stored, or inverted (i.e., multiplied by −1), depending upon whether the forward or reverse portions of the pulse is being generated, in the case where the FIR pulse is to be symmetric about the peak location.

The output of final adder $95_0$ in the pulse generation sequence is applied to one input of each of multipliers 98I, 98Q. Signals I/Q GAIN from peak detection circuit 40 are stored in holding register 96; the in-phase (I) gain is applied to a second input of multiplier 98I, while the quadrature-phase (Q) gain is applied to a second input of multiplier 98Q. These gains effect not only the magnitude scaling required to compress the peak amplitude of the sample, but also the appropriate phase behavior of the compensating pulse. In the preferred embodiment of the invention, the compensating pulse is scaled so that the peak held in filter LUT memory 90 is unity, thus avoiding additional scaling for the peak cancellation. The output of multiplier 98I produces the sequence of in-phase cancellation pulse values, and the output of multiplier 98Q produces the corresponding sequence of quadrature-phase cancellation pulse values.

In operation, the detection of a qualifying peak is received by cancellation pulse generator $42_k$ via signal QUAL, in combination with the signals I/Q GAIN indicating the gain scaling for the I, Q components, and signal LOCATION which presents an offset value indicative of the position of the peak within the symbol stream to be corrected. The offset value is applied, via multiplier 93, to multipliers 94, in combination with the corresponding value coefficients stored in filter LUT memory 90. The multiply-and-add operations embodied in the sequence of multipliers 94 and adders 95 generate an output value at the output of adder $95_0$, according to the desired pulse shape, and in a manner corresponding to an FIR filter. As each output value is presented in sequence at adder $95_0$, this output value is scaled by multiplier 98I to present an in-phase pulse component value, and is also scaled by multiplier 98Q to produce a quadrature-phase pulse component value. The next output value is then generated in sequence, producing the pulse.

Once the pulse generation sequence has proceeded to the center peak location, multiplier 93 begins to invert the offset values presented by offset register 92, so that the trailing portion of the symmetric pulse is next generated. The sequence continues until the pulse is complete, at which point control circuit 88 issues the DONE signal to indicate that it is ready to receive data corresponding to another peak to be compensated.

Alternative realizations of cancellation pulse generator $42_k$ according to this embodiment of the invention may be used. For example, the hardware may involve a single multiplier and adder sequence, with the results of the adder recycled to the multiplier in a controlled manner, such that every three passes through the multiplier-adder (for a 2d order IIR) generates a single output value. Further in the alternative, the in-phase and quadrature-phase output values may be presented in multiplexed fashion to adder 46 (FIG. 4).

Referring back to FIG. 5, the in-phase and quadrature pulse values produced by cancellation pulse generator 42 are forwarded to adder 46, for summing with the symbol stream itself. The symbol stream IN, as shown in FIG. 5, is delayed by matching delay stage 44 so that the cancellation pulse is applied to the appropriate location in the time-domain symbol stream and thus reduce the peak amplitude at the correct point. Similarly, other cancellation pulse generators 42 are also presenting cancellation pulse sequences at this time, which are aligned in time and summed with the other cancellation pulses simultaneously. The output of adder 46 thus corresponds to the symbol stream with up to four (in this example) cancellation pulses applied.

Figure 14A:
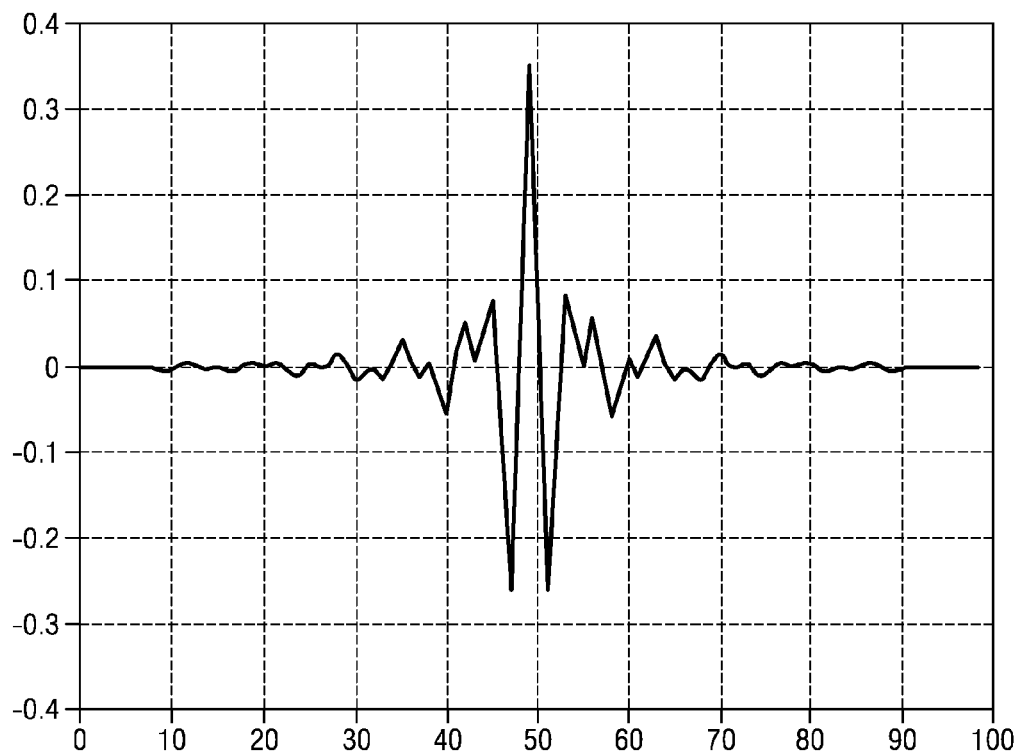
FIGS. 14a and 14b are plots illustrating the time-domain impulse response of peak cancellation pulses according to preferred embodiments of the invention.

As evident from FIGS. 5 and 11, the delay through cancellation pulse generators 42 relative to matching delay stage 44 must be closely controlled in order for the peak to be properly compensated, and also to reduce the extent to which undesirable noise is generated. In the embodiment of cancellation pulse generator $42_k$ shown in FIG. 11, a symmetric FIR template is used for the generation of the pulse, with the template peak to be coincident with the peak that is being compensated. If this symmetric FIR template is a linear phase FIR (as is desirable), the template peak will also be at the peak of the FIR frequency response, which presents an additional phase delay to be introduced into the main signal path (i.e., matching delay stage 44) so that alignment can occur. FIG. 14a illustrates the impulse response of such a linear phase symmetric FIR template, showing that the delay between the beginning of the response and the peak is substantial. This additional delay of course requires additional hardware and complexity, indeed in the critical main signal path itself.

It has been discovered, in connection with an alternative preferred embodiment of the invention, that there is no phase characteristic that is of critical importance in the digital filter template used to generate the cancellation pulse. Because of this additional degree of freedom, it has been discovered that the filter template in cancellation pulse generator 42 can be constructed to minimize the delay at the template peak, so long as other objectives of peak compression unit 16 are achieved.

Figure 14B:
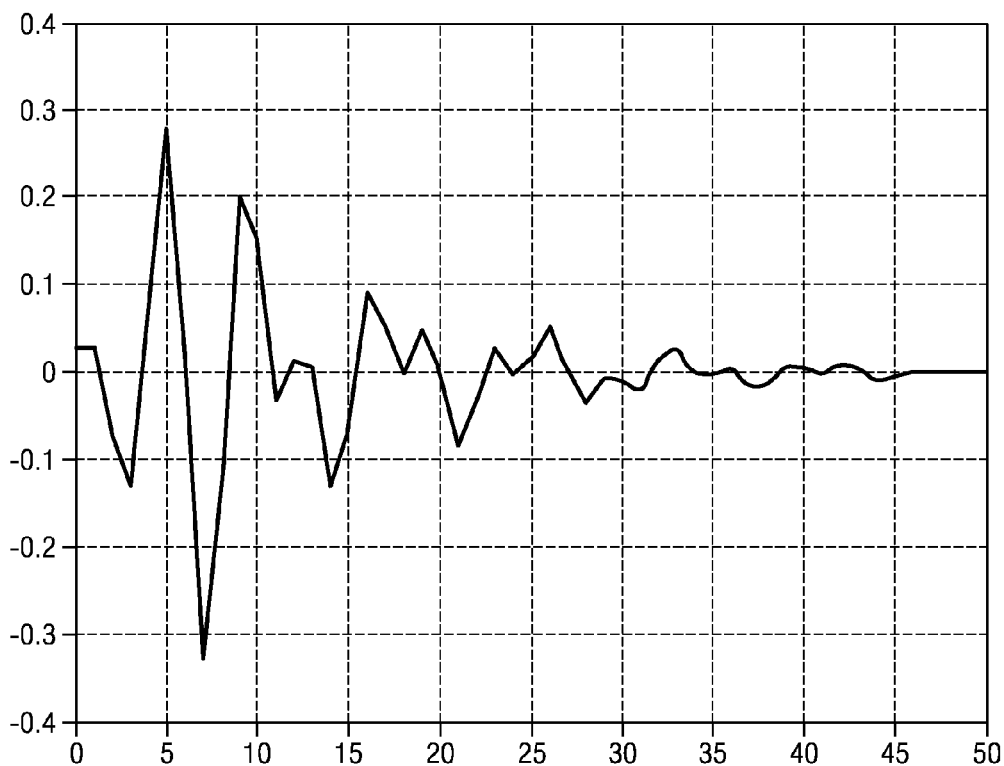

According to this alternative preferred embodiment of the invention, therefore, cancellation pulse generator $42_k$ is implemented as a minimum phase infinite impulse response (IIR) filter. FIG. 14b illustrates the impulse response of such a minimum phase filter. As evident from FIG. 14b, the correction peak in this impulse response occurs relatively early relative to the beginning of the pulse, and as such the signal delay is quite short. As known in the art, the IIR filter cannot be implemented in the form of a look-up table template, as the output of the IIR filter depends upon previous output samples. As such, the IIR filter is implemented in the conventional manner, with multipliers and delay stages, followed by an adder stage. Alternatively, it has been discovered that a minimum phase FIR template may also be used according to this embodiment of the invention, achieving equivalent delay and filter length. However, the IIR implementation has been observed to be advantageous because it is able to process several peaks simultaneously; in contrast, the use of a 6-pole IIR to generate the cancellation pulse can process multiple peaks simultaneously without requiring additional hardware.

Referring back to FIG. 4, as mentioned above, each peak detection and cancellation circuit 32 is similarly constructed and operates in this manner. As shown, multiple peak detection and cancellation circuits 32 are cascaded in peak compression unit 16, according to this embodiment of the invention. As such, the symbol stream output by first peak detection and cancellation circuit $32_1$, after identified qualifying peaks have been compressed, is applied to second peak detection and cancellation circuit $32_2$. This second peak detection and cancellation circuit $32_2$ repeats the peak detection and cancellation process described above, again analyzing the symbol stream for peaks above the peak qualifying threshold, and generating one or more cancellation pulses that are intended to bring the peak amplitude down below a correction threshold, without unduly degrading the signal-to-noise ratio of the symbol stream. This repeated peak detection and correction thus compensates for any peaks that were created because of the peak detection and compression of the first pass (i.e., due to "peak regrowth").

According to this exemplary implementation, as shown in FIG. 4, four peak detection and cancellation circuits $32_1$ through $32_4$ are provided in peak compression unit 16. While of course the number of peak detection and cancellation circuits 32 may vary from implementation to implementation, depending in large part upon the dynamic range characteristics of the downstream power amplifier, it is contemplated that peak compression unit 16 including on the order of three to five peak detection and cancellation circuits 32 will be suitable for most modern implementations.

Figure 12:
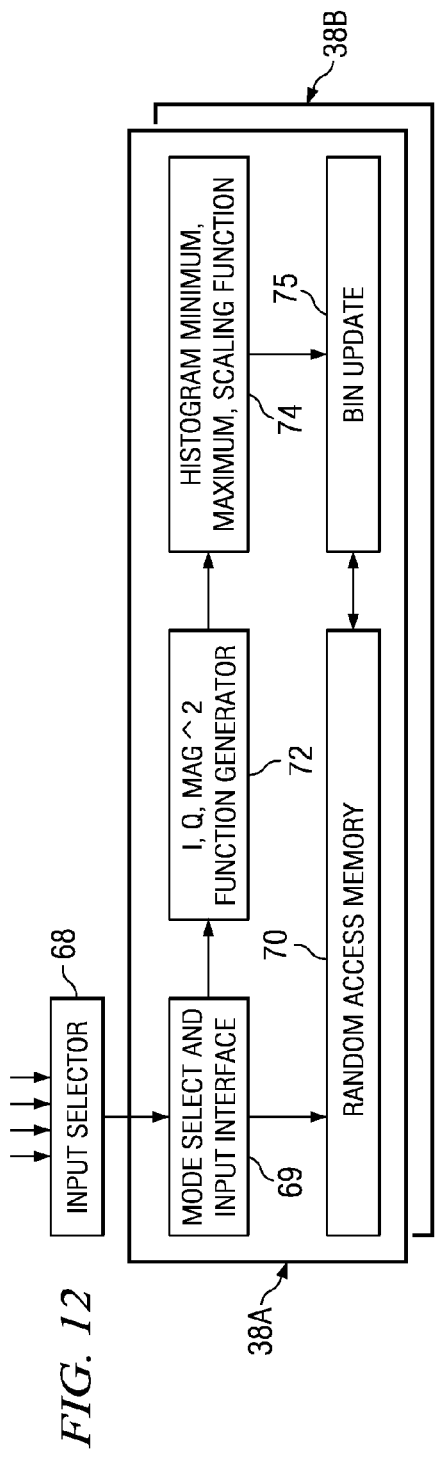
FIG. 12 is an electrical diagram, in block form, of a snapshot memory in the peak compression unit of FIG. 4 according to the preferred embodiment of the invention.

Circuitry is preferably included within peak compression unit 16 to monitor its performance over time, and for particular signal streams. Referring back to FIG. 5, peak compression unit 16 includes snapshot RAM with capture and calculation circuitry 38, which receives inputs from each of peak detection and cancellation circuits 32. FIG. 12 illustrates an exemplary realization of snapshot RAM with capture and calculation circuitry 38, as will now be described.

As shown in FIG. 5 in combination with FIG. 12, input selector 68 receives inputs from the outputs of each of peak detection and cancellation circuits 32, and also from the symbol stream prior to its application to first peak detection and cancellation circuits $32_1$. These inputs preferably are a high precision measurement of the amplitude of each sample at the selected input, for example up to thirty-two bits per complex sample (sixteen bits I, sixteen bits Q). Input selector 68 receives these samples, and selects the desired inputs over time for measurement and monitoring. In this manner, the incoming signal can be compared against the symbol streams after each peak detection and cancellation circuit 32, to determine the efficiency of the peak compression being carried out by peak compression unit 16.

According to this preferred embodiment of the invention, two snapshot RAM pages 38A, 38B are provided, each of which are user-programmable and flexible, for example under program or user control via processor 18 and control interface 39. In a snapshot mode, mode select and input interface 69 in each of snapshot RAM pages 38A, 38B simply receives the measured samples from input selector 68, and store the sample values sequentially in RAM 70.

In histogram mode, mode select and input interface 69 receives the measure samples from input selector 68, and forwards each sample value to magnitude function generator 72, which calculates the magnitude of each sample by complex conjugate multiplication. The calculated magnitude is then scaled by histogram scaling function 74, and compared to various bin limits of the histogram of magnitudes to be derived, for updating of the bin count by bin update unit 75. The resulting bin count is then stored in RAM 70.

In either the snapshot or histogram mode, processor 18 can interrogate snapshot RAM pages 38A, 38B to retrieve the sample data or histograms. Processor 18 then may execute statistical programs or the like to analyze the effect of peak compression unit 16, and its performance in reducing the overall peak-to-average ratio.

Referring back to FIG. 4, the output of the final peak detection and cancellation circuit $32_4$ is then re-interpolated to remove the effects of downsampler 30. This interpolation is carried out by the combination of interpolation circuit 33, which receives the output symbol stream and presents a simple linear or other interpolation value between symbol values. These interpolated values are sequenced with the true output samples by multiplexer 35, and scaled by output gain scaling circuit 35 as desired.

According to the preferred embodiment of the invention, final output limiter 37 is applied to the interpolated scaled symbol stream. Output limiter 37 may be implemented as a conventional peak compression unit, such as described in U.S. Pat. No. 6,009,090 and U.S. Pat. No. 5,621,762; alternatively, output limiter 37 may be a conventional AGC circuit, a conventional hard limiter, or a conventional "soft" limiter. In any case, output limiter 37 compresses the peaks of any final sample amplitudes that remain after the multiple-stage peak compression applied by peak detection and cancellation circuits 32, to insure that any unprocessed peaks or regrown peaks are limited. The final compressed symbol stream is then forwarded from output limiter 37 to DAC 20 in base station 15 (FIG. 3), for conversion into the analog domain, upconverting to RF frequencies by RF converter 22, and amplification by power amplifier 24.

According to the preferred embodiment of the invention, therefore, improved peak compression performance is accomplished in an extremely efficient and flexible manner. By using multiple stages of peak detection and correction, the effects of peak regrowth can be greatly reduced. In addition, the multiple stages permit each peak compression stage to be quite efficient, and in fact not overly concerned with processing each and every detected peak. The cancellation pulse generator resources in each stage can thus be kept quite modest. Further, the number of stages that are applied to a given signal can be selected under user or program control, providing great flexibility in the operation of the wireless base station. Indeed, the peak compression unit according to the preferred embodiment of the invention can gather its own statistics, by way of a snapshot or histogram memory, from which the decisions regarding the number of operative stages and the like can be made.

While present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. An integrated circuit for compressing peak sample values in spread spectrum signals comprising:
   a plurality of peak detection and cancellation circuits arranged in a sequence, a first detection and cancellation circuits having an input coupled to receive a spread spectrum symbol stream, at least a second peak detection and cancellation circuit having an input coupled to the output of a preceding peak detection and cancellation circuit in the sequence, each peak detection and cancellation circuit for applying a cancellation pulse to a received symbol stream responsive to detecting a peak amplitude in the received symbol stream exceeding a threshold, and for presenting a compressed symbol stream including the received symbol stream and cancellation pulse at its output, wherein at least one of the plurality of peak detection and cancellation circuits comprises:
   a peak detector circuit, for identifying a peak location and a filter value corresponding to an amplitude at the peak location;
   a cancellation circuit, for producing a cancellation pulse corresponding to the identified peak location and the corresponding filter value;
   a delay stage for delaying the received symbol stream; and
   an adder, for combining the delayed received symbol stream and the cancellation pulse.

2. The integrated circuit of claim 1, wherein the peak detector circuit comprises
   an interpolating circuit, for generating a curve-fitting estimate of values near a sample point;
   an evaluation circuit, for determining the peak location from the curve-fitting estimate;
   a value computation circuit, for evaluating the amplitude at the peak location;
   a qualifier, for comparing the evaluated amplitude against a threshold value; and
   a filter generator, for producing the filter value from the evaluated amplitude.

3. The integrated circuit of claim 2, wherein the interpolating circuit comprises a Farrow filter bank.

4. The integrated circuit of claim 2, wherein the evaluation circuit is a binary search function.

5. The integrated circuit of claim 2, wherein the qualifier is also for issuing a qualifying signal for a first sample point responsive to the evaluated amplitude of the first sample point exceeding a threshold value in combination with no subsequent sample points in a selected interval having a larger evaluated amplitude than that of the first sample point.

6. An integrated circuit for compressing peak sample values in spread spectrum signals, comprising:
   a plurality of peak detection and cancellation circuits arranged in a sequence, a first peak detection and cancellation circuit having an input coupled to receive a spread spectrum symbol stream, at least a second peak detection and cancellation circuit having an input coupled to the output of a preceding peak detection and cancellation circuit in the sequence, each peak detection and cancellation circuit for applying a cancellation pulse to a received symbol stream responsive to detecting a peak amplitude in the received symbol stream exceeding a threshold, and for presenting a compressed symbol stream including the received symbol stream and cancellation pulse at its output;

wherein at least one of the plurality of peak detection and cancellation circuits comprises:

a peak detector circuit, for identifying a peak location and a filter value corresponding to an amplitude at the peak location, wherein the peak detector circuit comprises:

an interpolating circuit, for generating a curve-fitting estimate of values near a sample point;

an evaluation circuit, for determining the peak location from the curve-fitting estimate;

a value computation circuit, for evaluating the amplitude at the peak location;

a qualifier, for comparing the evaluated amplitude against a threshold value;

a filter generator, for producing the filter value from the evaluated amplitude; and a peak pre-qualifier, for comparing a magnitude for each sample point in the received symbol stream with magnitudes of one or more neighboring samples, and for pre-qualifying a sample point if its magnitude is greater than that of the one or more neighboring samples;

wherein the interpolating circuit produces a curve-fitting estimate of values near a sample point responsive to the peak pre-qualifier pre-qualifying the sample point;

a delay stage for delaying the received symbol stream; and an adder, for combining the delayed received symbol stream and the cancellation pulse.

7. An integrated circuit for compressing peak sample values in spread spectrum signals, comprising:

a plurality of peak detection and cancellation circuits arranged in a sequence, a first detection and cancellation circuits having an input coupled to receive a spread spectrum symbol stream, at least a second peak detection and cancellation circuit having an input coupled to the output of a preceding peak detection and cancellation circuit in the sequence, each peak detection and cancellation circuit for applying a cancellation pulse to a received symbol stream responsive to detecting a peak amplitude in the received symbol stream exceeding a threshold, and for presenting a compressed symbol stream including the received symbol stream and cancellation pulse at its output;

wherein at least one of the plurality of peak detection and cancellation circuits comprises:

a peak detector circuit, for identifying a peak location and a filter value corresponding to an amplitude at the peak location;

a delay stage for delaying the received symbol stream; and an adder, for combining the delayed received symbol stream and the cancellation pulse; and at least two cancellation pulse generators coupling said peak detector circuit to said adder.

8. The integrated circuit of claim 7, wherein each of the at least two cancellation pulse generators comprises:

a look-up table memory for storing a plurality of finite impulse response (FIR) pulse coefficients;

computational circuitry, coupled to the look-up table memory and to the peak detector circuit, for producing a data stream corresponding to the combination of the FIR pulse coefficients with an offset corresponding to the peak location; and gain scaling circuitry, for scaling the data stream responsive to the filter value from the filter generator of the peak detector circuit.

9. The integrated circuit of claim 8, wherein the filter value comprises in-phase and quadrature-phase components; and wherein the output of the gain scaling circuitry comprises in-phase and quadrature-phase components.

10. The integrated circuit of claim 7, wherein each of the at least two cancellation pulse generators comprises:

infinite impulse response circuitry, for producing a data stream corresponding to an offset corresponding to the peak location.

11. The integrated circuit of claim 7, further comprising:

an unprocessed peak counter, for counting a number of peak amplitudes not processed by the at least two cancellation pulse generators in each of the plurality of peak detection and cancellation circuits.

12. A method of transmitting a spread spectrum communications signal, comprising the steps of:

applying at least one peak compression pulse to the spread spectrum signal at a first peak sample point, the magnitude of the signal at the first peak sample point exceeding a peak qualifying threshold, to produce a peak-compressed symbol stream;

repeating, at least twice, the applying step on the peak-compressed symbol stream, wherein each applying step comprises:

identifying a peak location and a filter value corresponding to an amplitude at a peak location in the signal;

producing a cancellation pulse corresponding to the identified peak location and the corresponding filter value;

delaying the spread spectrum signal to match the peak location; and combining the delayed received signal and the cancellation pulse; and amplifying an analog modulated signal corresponding to a peak-compressed symbol stream from the last of the repeated applying steps to produce the signal to be transmitted.

13. The method of claim 12, wherein the identifying step comprises:

generating a curve-fitting estimate over a delay interval near a sample point;

determining the peak location within the delay interval from the curve-fitting estimate;

evaluating the amplitude at the determined peak location;

comparing the evaluated amplitude against a peak qualifying threshold; and producing the filter value responsive to the evaluated amplitude.

14. The method of claim 13, wherein the step of generating a curve-fitting estimate comprises applying the value of the sample point and a plurality of neighboring sample points to a Farrow filter.

15. The method of claim 13, wherein the step of determining the peak location from the curve-fitting estimate comprises performing a binary search of amplitudes of the estimated curve over the delay interval.

16. The method of claim 12, wherein the step of producing a cancellation pulse is performed within each applying step simultaneously for a plurality of identified peak locations in the symbol stream.

17. The method of claim 12, wherein the step of producing a cancellation pulse comprises:

accessing a look-up table memory to retrieve finite impulse response (FIR) pulse coefficients;

combining the FIR pulse coefficients with an offset corresponding to the peak location to produce a data stream; and gain scaling the data stream responsive to the filter value.

18. The method of claim 17, wherein the gain scaling step comprises applying in-phase and quadrature-phase components of the filter value to the data stream to produce in-phase and quadrature-phase components of the data stream.

19. The method of claim 12, wherein the step of generating a cancellation pulse comprises:
applying an infinite impulse response filter to an offset corresponding to the peak location.

20. A method of transmitting a spread spectrum communications signal, comprising the steps of:
applying at least one peak compression pulse to the spread spectrum signal at a first peak sample point, the magnitude of the signal at the first peak sample point exceeding a peak qualifying threshold, to produce a peak-compressed symbol stream;
repeating, at least twice, the applying step on the peak-compressed symbol stream;
amplifying an analog modulated signal corresponding to a peak-compressed symbol stream from the last of the repeated applying steps to produce the signal to be transmitted;
wherein each applying step comprises:
identifying a peak location and a filter value corresponding to an amplitude at a peak location in the signal;
producing a cancellation pulse corresponding to the identified peak location and the corresponding filter value;
delaying the spread spectrum signal to match the peak location;
combining the delayed received signal and the cancellation pulse;
wherein each identifying step comprises:
generating a curve-fitting estimate over a delay interval near a sample point;
determining the peak location within the delay interval from the curve-fitting estimate;
evaluating the amplitude at the determined peak location;
comparing the evaluated amplitude against a peak qualifying threshold; and
producing the filter value responsive to the evaluated amplitude.
comparing a magnitude of each sample point in the received symbol stream with magnitudes of one or more neighboring samples;
pre-qualifying a sample point if its magnitude is greater than that of the one or more neighboring samples;
wherein the identifying step is performed for pre-qualified sample points.

21. A method of transmitting a spread spectrum communications signal, comprising the steps of:
applying at least one peak compression pulse to the spread spectrum signal at a first peak sample point, the magnitude of the signal at the first peak sample point exceeding a peak qualifying threshold, to produce a peak-compressed symbol stream;
repeating, at least once, the applying step on the peak-compressed symbol stream;
amplifying an analog modulated signal corresponding to a peak-compressed symbol stream from the last of the repeated applying steps to produce the signal to be transmitted;
wherein each applying step comprises:
identifying a peak location and a filter value corresponding to an amplitude at a peak location in the signal;
producing a cancellation pulse corresponding to the identified peak location and the corresponding filter value;
delaying the spread spectrum signal to match the peak location;
combining the delayed received signal and the cancellation pulse;
wherein each identifying step comprises:
generating a curve-fitting estimate over a delay interval near a sample point;
determining the peak location within the delay interval from the curve-fitting estimate;
evaluating the amplitude at the determined peak location;
comparing the evaluated amplitude against a peak qualifying threshold; and
producing the filter value responsive to the evaluated amplitude.
responsive to the comparing step determining that the evaluated amplitude of a first sample point exceeds the peak qualifying threshold, comparing the evaluated amplitudes of peak sample points over a selected number of subsequent sample points;
wherein the producing step is performed for the first sample point responsive to no peak sample points in the selected number of subsequent sample points having a larger evaluated amplitude than that of the first sample point;
responsive to the comparing step determining that the evaluated amplitude of a second sample point within the selected number of subsequent sample points has a larger evaluated amplitude than that of the first sample point, inhibiting producing of the filter value for the first sample point and then repeating the comparing the evaluated amplitudes of peak sample points over a selected number of subsequent sample points relative to the second sample point.

22. A wireless base station for transmitting spread spectrum signals corresponding to a plurality of communications channels, comprising:
at least one coder/decoder for generating a spread spectrum signal over a plurality of channels, the signal being arranged in the form of a digital symbol stream;
a plurality of peak detection and cancellation circuits arranged in a sequence, a first peak detection and cancellation circuit having an input coupled to receive the digital symbol stream, at least a second peak detection and cancellation circuit having an input coupled to the output of a preceding peak detection and cancellation circuit in the sequence, each peak detection and cancellation circuit for applying a cancellation pulse to a received symbol stream responsive to detecting a peak amplitude in the received symbol stream exceeding a threshold, and for presenting a compressed symbol stream including the received symbol stream and cancellation pulse at its output;
a digital-to-analog converter for converting the compressed symbol stream to an analog signal;
modulation circuitry for producing a modulated signal, corresponding to the analog signal, at a carrier frequency; and a power amplifier, for amplifying the modulated signal for transmission;

wherein at least one of the plurality of peak detection and cancellation circuits comprises:

a peak detector circuit, for identifying a peak location and a filter value corresponding to an amplitude at the peak location;

at least one cancellation pulse generator, for producing a cancellation pulse corresponding to the identified peak location and the corresponding filter value;

a delay stage for delaying the received symbol stream; and an adder, for combining the delayed received symbol stream and the cancellation pulse.

23. The base station of claim 22, wherein the peak detector circuit comprises
an interpolating circuit, for generating a curve-fitting estimate of values near a sample point;
an evaluation circuit, for determining the peak location from the curve-fitting estimate;
a value computation circuit, for evaluating the amplitude at the peak location;
a qualifier, for comparing the evaluated amplitude against a threshold value; and
a filter generator, for producing the filter value from the evaluated amplitude.

24. The base station of claim 23, wherein the interpolating circuit comprises a Farrow filter bank.

25. The base station of claim 23, wherein the evaluation circuit is a binary search function.

26. The base station of claim 23, wherein the qualifier is also for issuing a qualifying signal for a first sample point responsive to the evaluated amplitude of the first sample point exceeding a threshold value in combination with no subsequent sample points in a selected interval having a larger evaluated amplitude than that of the first sample point.

27. The base station of claim 26, wherein the at least one of cancellation pulse generator comprises:
infinite impulse response circuitry, for producing a data stream corresponding to an offset corresponding to the peak location.

28. The base station of claim 22,
wherein the at least one cancellation pulse generator comprises:
a look-up table memory for storing a plurality of finite impulse response (FIR) pulse coefficients;
computational circuitry, coupled to the look-up table memory and to a peak detector circuit, for producing a data stream corresponding to the combination of the FIR pulse coefficients with an offset corresponding to the peak location; and
gain scaling circuitry coupled to the computational circuitry, for scaling the data stream responsive to the filter value from a filter generator of the peak detector circuit.

29. The base station of claim 28, wherein the filter value comprises in-phase and quadrature-phase components; and
wherein the output of the gain scaling circuitry comprises in-phase and quadrature-phase components.

30. A wireless base station for transmitting spread spectrum signals corresponding to a plurality of communications channels, comprising:
at least one coder/decoder for generating a spread spectrum signal over a plurality of channels, the signal being arranged in the form of a digital symbol stream;
a plurality of peak detection and cancellation circuits arranged in a sequence, a first peak detection and cancellation circuit having an input coupled to receive the digital symbol stream, at least a second peak detection and cancellation circuit having an input coupled to the output of a preceding peak detection and cancellation circuit in the sequence, each peak detection and cancellation circuit for applying a cancellation pulse to a received symbol stream responsive to detecting a peak amplitude in the received symbol stream exceeding a threshold, and for presenting a compressed symbol stream including the received symbol stream and cancellation pulse at its output;
a digital-to-analog converter for converting the compressed symbol stream to an analog signal;
modulation circuitry for producing a modulated signal, corresponding to the analog signal, at a carrier frequency;
a power amplifier, for amplifying the modulated signal for transmission; and
a peak pre-qualifier, for comparing a magnitude for each sample point in the received symbol stream with magnitudes of one or more neighboring samples, and for pre-qualifying a sample point if its magnitude is greater than that of the one or more neighboring samples.

* * * * *